United States Patent [19]
Hashimoto et al.

[11] Patent Number: 5,703,367
[45] Date of Patent: Dec. 30, 1997

[54] HUMAN OCCUPANCY DETECTION METHOD AND SYSTEM FOR IMPLEMENTING THE SAME

[75] Inventors: Kazuhiko Hashimoto, Moriguchi; Nobuyuki Yoshiike, Ikoma; Katsuya Morinaka, Toyonaka, all of Japan

[73] Assignee: Matsushita Electric Industrial Co., Ltd., Osaka, Japan

[21] Appl. No.: 569,715

[22] Filed: Dec. 8, 1995

[30] Foreign Application Priority Data

Dec. 9, 1994 [JP] Japan ................................ 6-306306

[51] Int. Cl.⁶ .................................................... G01J 5/02
[52] U.S. Cl. .................................................... 250/342
[58] Field of Search ........................ 250/342, DIG. 1

[56] References Cited

U.S. PATENT DOCUMENTS

| | | | |
|---|---|---|---|
| 4,847,485 | 7/1989 | Koelsch | 250/221 |
| 4,849,737 | 7/1989 | Kirihata et al. | 340/567 |
| 5,068,537 | 11/1991 | Ishikawa et al. | 250/342 |

FOREIGN PATENT DOCUMENTS

| | | |
|---|---|---|
| 0 296 011 | 12/1988 | European Pat. Off. . |
| 0 582 941 A1 | 2/1994 | European Pat. Off. . |
| 42 20 508 A1 | 12/1993 | Germany . |
| 57-185695 | 11/1982 | Japan . |
| 64-88391 | 4/1989 | Japan . |
| 2-183752 | 7/1990 | Japan . |
| 2-196932 | 8/1990 | Japan . |

OTHER PUBLICATIONS

European Search Report No. 95119313.5.

Primary Examiner—David P. Porta
Assistant Examiner—David Vernon Bruce
Attorney, Agent, or Firm—Ratner & Prestia

[57] ABSTRACT

A primary object of the invention is to provide a method and system for detecting humans present in a restricted space, particularly, in a commuter train, a building, etc., by using an infrared sensor capable of detecting the presence of humans, and for judging the ratio of human occupancy in that space. To accomplish this object, according to the invention, the infrared sensor is installed, for example, on a ceiling near the center of a room, and the whole room space is scanned by the infrared sensor to detect in which region of the room a human is present. The proportion of human presence regions thus detected to the whole detection region is determined as the ratio of human occupancy. More specifically, a designated space is detected by the infrared sensor, and only human presence regions are extracted from that space; then, the ratio of human occupancy in the room is estimated from the ratio of the area of the extracted human presence regions to the area of the whole detection area.

40 Claims, 16 Drawing Sheets

× : SIGNAL STRENGTH
PEAK POSITION

INTERIOR DIMENSIONS OF MEETING ROOM

RELATIVE DISTANCE FROM SENSOR INSTALLATION POSITION TO ACTUAL POSITION OF DETECTION TARGET CORRESPONDING TO PIXELS IN THERMO IMAGE

HUMAN OCCUPANCY DETECTION METHOD AND SYSTEM FOR IMPLEMENTING THE SAME

BACKGROUND OF THE INVENTION

1. Field of the Invention

The present invention relates to a human occupancy detection method that can be utilized when estimating a ratio of human occupancy in a restricted space such as a train or an elevator hall, and a system for implementing the same method.

2. Description of the Related Art

In such fields as security and air-conditioning control systems, there has been an increasing need in recent years to measure temperature distributions in restricted spaces in order to detect the presence or absence of humans there and the amount of their activities.

Some of known apparatus designed to measure spatial temperature distributions using infrared radiation employ a two-dimensional, quantum-type solid-state imaging infrared sensor.

Others employ a pyroelectric sensor to measure spatial temperature distributions, as described, for example, in Japanese Patent Unexamined Publication Nos. 64-88391, 57-185695, 2-183752, and 2-196932. Such a method uses a single pyroelectric sensor which is mechanically panned in horizontal and vertical directions to detect energy emission from various directions, thereby obtaining a temperature distribution. By obtaining the temperature distribution in this manner, the presence of a human in the target space can be detected.

In recent years, there has also arisen a strong need for equipment that can exactly measure the degree of crowdedness in a restricted space such as a train or an elevator hall. Traditionally, the degree of crowdedness of a public transport vehicle such as a commuter train has been judged by the train conductor who visually checks how crowded the train is, in terms of a percentage, such as 0 to 200%, against the capacity of the train. Train schedules have been worked out based on the percentage against the capacity determined by such a personal, and more or less subjective, judgement. This has resulted in situations where some trains are very crowded while others are much less crowded; furthermore, on the same train, some cars are crowded and others are not, the congestion rate thus varying greatly from train to train and from car to car.

If the congestion rate can be measured correctly, the variation in the congestion rate between trains or within the same train can be reduced by reflecting the data in the train schedule or by leading passengers to less crowded cars. One method under recent study has attempted to estimate the rate of congestion by measuring the weight of each car by using a pressure sensor.

This prior art method, however, has the problem that an accurate congestion rate, that is, the proportion of areas occupied by humans, cannot be obtained because the method does not take into account such factors as weight differences between people, between men and women, and between adults and children, and the weight of luggage.

On the other hand, in the case of the traditional method in which the proportion of areas occupied by humans in a train is judged based on the personal judgement of the train conductor, there is the problem that, since the judgement varies from one conductor to another, the train schedule worked out based on such judgement leads to a large variation in passenger occupancy rate from train to train.

Furthermore, if the passenger occupancy rate varies from one car to another on the same train, passengers have to take much trouble and effort to look around from one car to another to find a vacant seat.

In view of the above situation, it has been proposed to estimate the passenger occupancy rate by measuring the weight of each car of a train by means of a pressure sensor. This method, however, inevitably involves a practical problem; that is, detailed and accurate data on the proportion of areas occupied by humans (human occupancy ratio) cannot be obtained because the sensor detects not only the weight of passengers but the weight of luggage and other items, and also because weight differences between individual passengers, between men and women, and between adults and children are not taken into account. Another problem is that this method cannot be used for other applications than the application it is specifically designed for.

In buildings, such as exhibition halls and stores, human occupancy ratios, etc. have been measured by human senses, and accurate measurements have not been possible. In such places also, meticulous control of air-conditioning and lighting systems can be performed by detecting human occupancy ratios accurately and by measuring the state and degree of congestion. Furthermore, in an elevator hall, for example, where many people are waiting for elevators, there has been the problem that an elevator nearly fully loaded with people stops at the floor where many people are waiting, while a less crowded elevator passes that floor, thus leaving many people waiting for another elevator to come.

In view of the above-outlined problems, it is an object of the invention to provide a method and system that can easily extract a human presence region from a detection space such as a train, building, etc. and that can detect and determine the ratio of human occupancy in that space with high reliability and at low cost as compared to the prior known method and system.

SUMMARY OF THE INVENTION

A human occupancy detection method of the present invention comprises the following steps, wherein within a designated space a region containing at least a human is detected using an infrared sensor, a proportion that the detected object occupies in said space is calculated, and based on a result of the calculation, a ratio of human occupancy in said space is estimated.

A human occupancy detection method for detecting a ratio of human occupancy in a designated space of the present invention comprises the following steps, wherein said space is detected by an infrared sensor, only a human presence region is extracted from said detected space, and an area ratio of said extracted human presence region relative to a whole detection region is taken as the ratio of human occupancy.

A human occupancy detection method for detecting a ratio of human occupancy in a designated space of the present invention comprises the following steps, wherein said space is detected by an infrared sensor, a human presence impossible region and a human presence region are extracted from said detected space, said human presence impossible region is subtracted from a whole detection region, and an area ratio of said extracted human presence region relative to a result of the subtraction is taken as the ratio of human occupancy.

A human occupancy detection method for detecting a ratio of human occupancy in a designated space of the present invention comprises the following steps, wherein said space is detected by an infrared sensor, a human presence region is extracted from said detected space, the number of signal strength local peaks within said human presence region is obtained, and by taking into account the number of the local peaks thus obtained, the ratio of said human occupancy is estimated on a basis of an area ratio of said extracted human presence region to a whole detection region.

Preferably, in the human occupancy detection method for detecting a ratio of human occupancy in a designated space, when extracting only a human presence region from the space detected by the infrared sensor, a human detected region is identified by using a clustering technique based on fuzzy inference, and the ratio of human occupancy in the detected space is detected from a ratio of areas thereof. Alternatively, in the human occupancy detection method for detecting a ratio of human occupancy in a designated space, when extracting only a human presence region from the space detected by the infrared sensor, a human detected region is identified by using a modeling technique based on fuzzy inference, and the ratio of human occupancy in the detected space is detected from a ratio of areas thereof. Preferably, in the human occupancy detection method for detecting a ratio of human occupancy in a designated space, when extracting only a human presence region from the space detected by the infrared sensor, a human detected region is identified by dividing the detection region in a matrix form, and the ratio of human occupancy in the detected space is detected from a ratio of areas thereof.

Further preferably, in the human occupancy detection method for detecting a ratio of human occupancy in a designated space, there are provided an infrared array sensor constructed by arranging a plurality of detector elements in an array, a chopping means for periodically interrupting infrared radiation incident on the sensor, and a driving means for turning an aiming direction of the infrared array sensor in a stepwise manner, wherein, after making measurements on the outputs of the detector elements for each aiming direction, the aiming direction is turned through a prescribed angle by means of a motor, the measurements are sequentially repeated, and after finishing the measurements for a final aiming direction, the motor is rotated backward to an initial aiming direction, thereby extracting a human detected region from the whole detection region, and thus detecting the ratio of human occupancy from a ratio of areas thereof.

A human occupancy detection system for detecting a ratio of human occupancy in a designated space in a railroad car or a vestibule of a railroad car of the present invention comprises the following steps, wherein said space is detected by an infrared sensor, a human presence region is extracted from a whole detection region, the ratio of human occupancy in the detected space in the railroad car or the vestibule of the railroad car is detected from an area ratio of said extracted human presence region relative to said whole detection region, and said detected human occupancy ratio is notified to passengers in advance.

A human occupancy detection system for detecting a ratio of human occupancy in a designated space in an elevator hall of the present invention comprises the following steps, wherein said space is detected by an infrared sensor, a human presence region is extracted from a whole detection region, the ratio of human occupancy in the detected space in said elevator hall is detected from an area ratio of said extracted human presence region relative to said whole detection region, and said detected human occupancy ratio on each floor is fed back to an elevator control system, thereby facilitating smooth operation of elevators.

A human occupancy detection system for detecting a ratio of human occupancy in a designated space in a theater, exhibition hall, or like building of the present invention comprises the following steps, wherein said space is detected by an infrared sensor, a human presence region is extracted from a whole detection region, the ratio of human occupancy in the detected space in said building is detected from an area ratio of said extracted human presence region relative to said whole detection region, and said detected human occupancy ratio is fed back to air-conditioning and illumination control systems for said space.

A human occupancy detection system for detecting a ratio of human occupancy in a designated space at a bus stop of the present invention comprises the following steps, wherein said space is detected by an infrared sensor, a human presence region is extracted from a whole detection region, the ratio of human occupancy in the detected space of said bus stop is detected from an area ratio of said extracted human presence region relative to said whole detection region, and said detected human occupancy ratio is notified to a bus driver, thereby facilitating smooth operation of bus service.

Preferably, in the human occupancy detection system, when extracting only a human presence region from the space detected by the infrared sensor, a human detected region is identified by using a clustering technique or a modeling technique based on fuzzy inference, and the ratio of human occupancy in the detected space is detected from a ratio of areas thereof. Also preferably, when extracting only a human presence region from the space detected by the infrared sensor, a human detected region is identified by dividing the detection region in a matrix form, and the ratio of human occupancy in the detected space is detected from a ratio of areas thereof.

Further preferably, the human occupancy detection system comprises an infrared array sensor constructed by arranging a plurality of detector elements in an array, a chopping means for periodically interrupting infrared radiation incident on the sensor, and a driving means for turning an aiming direction of the infrared array sensor in a stepwise manner, wherein, after making measurements on the outputs of the detector elements for each aiming direction, the aiming direction is turned through a prescribed angle by means of a motor, the measurements are sequentially repeated, and after finishing the measurements for a final aiming direction, the motor is rotated backward to an initial aiming direction, thereby extracting a human detected region from the whole detection region, and thus detecting the ratio of human occupancy from a ratio of areas thereof, the detected human occupancy ratio then being fed back to a responsible control system.

According to the human occupancy detection method of the invention, a human presence region, a human presence impossible region, etc. are detected using, for example, an infrared sensor, and the ratio of the area occupied by the human presence region to the area of the whole detection region is obtained and is determined as the ratio of human occupancy in the target space. Further, by obtaining the number of signal strength peaks within the human presence region, for example, the density of that human presence region can be found, which serves to increase the accuracy in the detection of the human occupancy ratio. Furthermore, for example, when identifying a human presence region and even obtaining the number of persons present therein, a clustering technique or a modeling technique based on fuzzy inference may be used, or alternatively, the whole space may be divided in a matrix form. In this way, quick, accurate, and reliable detection of a human occupancy ratio can be achieved with relative ease and at low cost. Specifically, by using a rotary-type pyroelectric infrared sensor, all the shortcomings encountered with pressure sensors are eliminated and humans can be detected accurately and reliably.

Further, according to the human occupancy detection system of the invention, the ratio of human occupancy, for example, in a public transport vehicle, such as a commuter train, or inside a building, is detected and judged, and the result is fed back to responsible control systems, to help to create a comfortable space or conditions for humans. In the case of a commuter train, for example, passengers can be alerted to the degree of crowdedness of the train, and in the case of an elevator hall, information about the volume of people waiting for an elevator is fed back to the elevator control system so that comfortable conditions can be created for humans. Moreover, in the case of a building such as a theater or an exhibition hall, illumination and air-conditioning systems can be controlled effectively by measuring the ratio of human occupancy in the designated space of the building. Likewise, by measuring the ratio of human occupancy at a bus stop, bus schedules can be implemented more smoothly. The system using the sensor of the invention can be constructed compact and at low cost.

Thus, the human occupancy detection system of the invention is very simple in configuration, and by using this sensor system, accurate detection of humans can be achieved with ease and at low cost. Accordingly, by using the above-described construction, human occupancy detection can be performed easily, accurately, and reliably.

DESCRIPTION OF THE REFERENCE NUMERALS

11. Infrared sensor, 12. Detection region, 13. Human body, 21. Detection region, 22. Human presence region, 31. Detection region, 32. Human presence impossible region, 33. Human presence region

DESCRIPTION OF THE PREFERRED EMBODIMENTS

The preferred embodiments of the present invention will now be described below with reference to the accompanying drawings.

(EMBODIMENT 1)

First, a human occupancy detection method according to a first embodiment of the invention will be described with reference to drawing.

Figure 1:
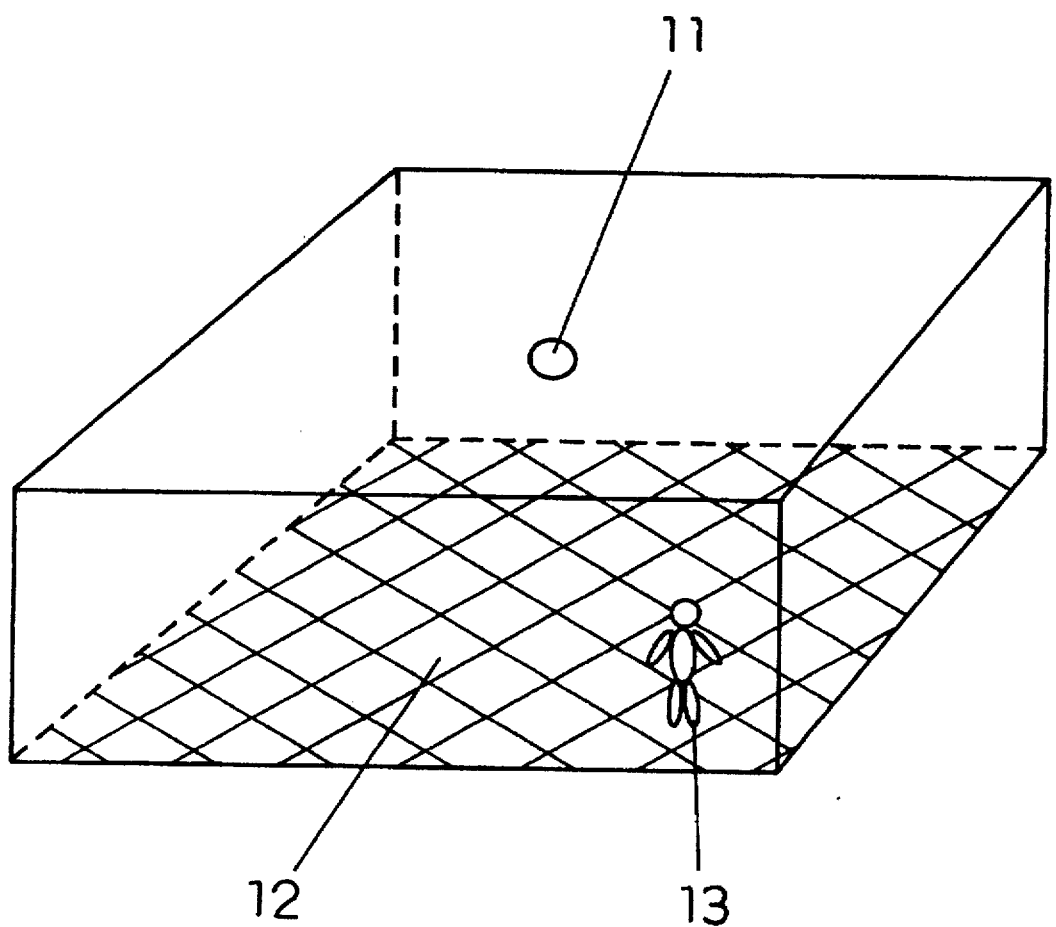
FIG. 1 is a diagram showing an arrangement of an infrared sensor and a detection region according to a human occupancy detection method in a first embodiment of the invention.

FIG. 1 is a diagram showing an arrangement of an infrared sensor and a detection region according to the human occupancy detection method in the first embodiment of the invention.

The infrared sensor 11 is installed on the ceiling near the center of a room, and the entire room is set as the detection region 12. In this situation, detection is performed to determine in which region of the room a human 13 exists.

Figure 2:
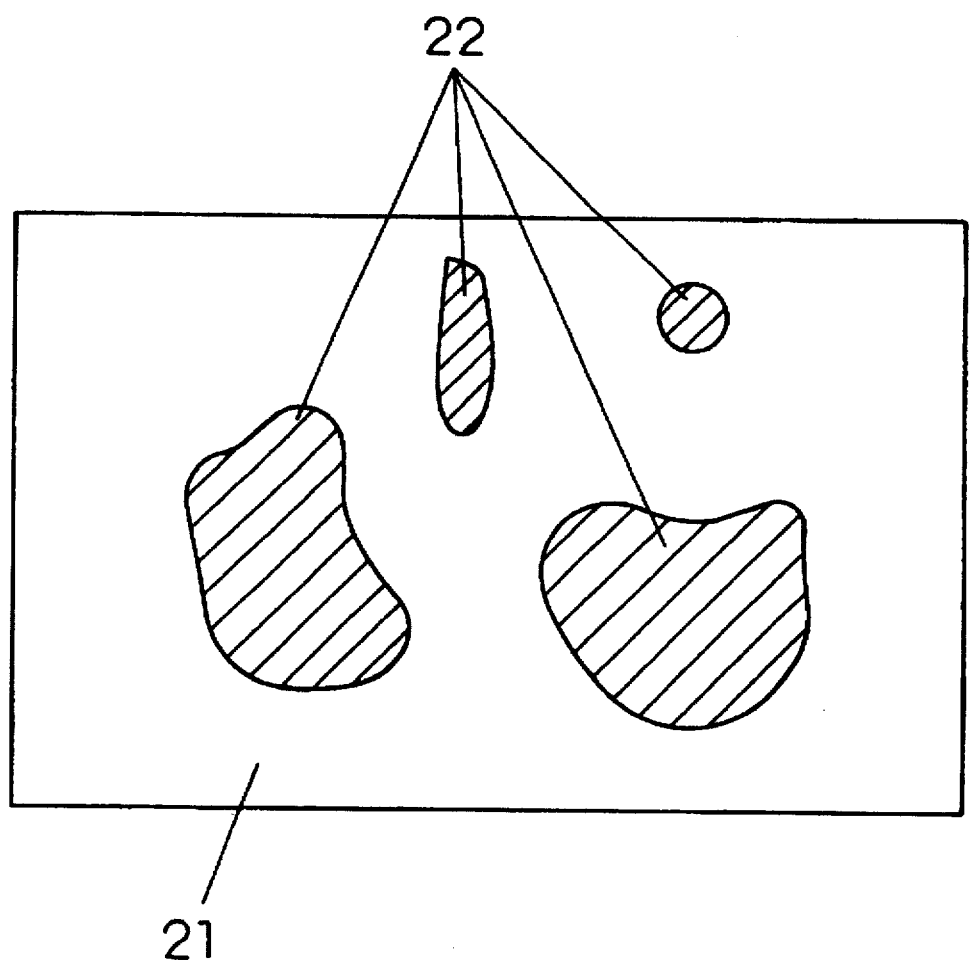
FIG. 2 is a diagram showing human presence regions in a detection region for explaining a human occupancy ratio, according to the human occupancy detection method in the first embodiment of the invention.

FIG. 2 is concerned with a specific example showing human presence regions within the detection region as detected with the above arrangement. It can be seen that only the regions where the presence of humans is detected are restricted. The proportion of the human presence regions 22 to the whole detection region 21 represents the ratio of human occupancy in the room. That is, a designated space is detected by the infrared sensor, and only the human presence regions are extracted from that space; then, the ratio of the area of the thus extracted human presence regions to the area of the whole detection region is determined as the ratio of human occupancy in that room.

When extracting only the human presence regions from the space detected by the infrared sensor, a clustering technique based on fuzzy inference may be used to identify human detected regions. In this case also, the ratio of the area of the thus identified human presence regions to the area of the whole detection region can be determined as the human occupancy ratio.

(EMBODIMENT 2)

Next, a human occupancy detection method according to a second embodiment of the invention will be described with reference to drawing.

In this embodiment, the infrared sensor 11 is installed on the ceiling near a wall of the room, unlike the arrangement shown in FIG. 1, and the entire room is set as the detection region 12. In this situation, detection is performed to determine in which region of the room the human 13 exists.

Figure 3:
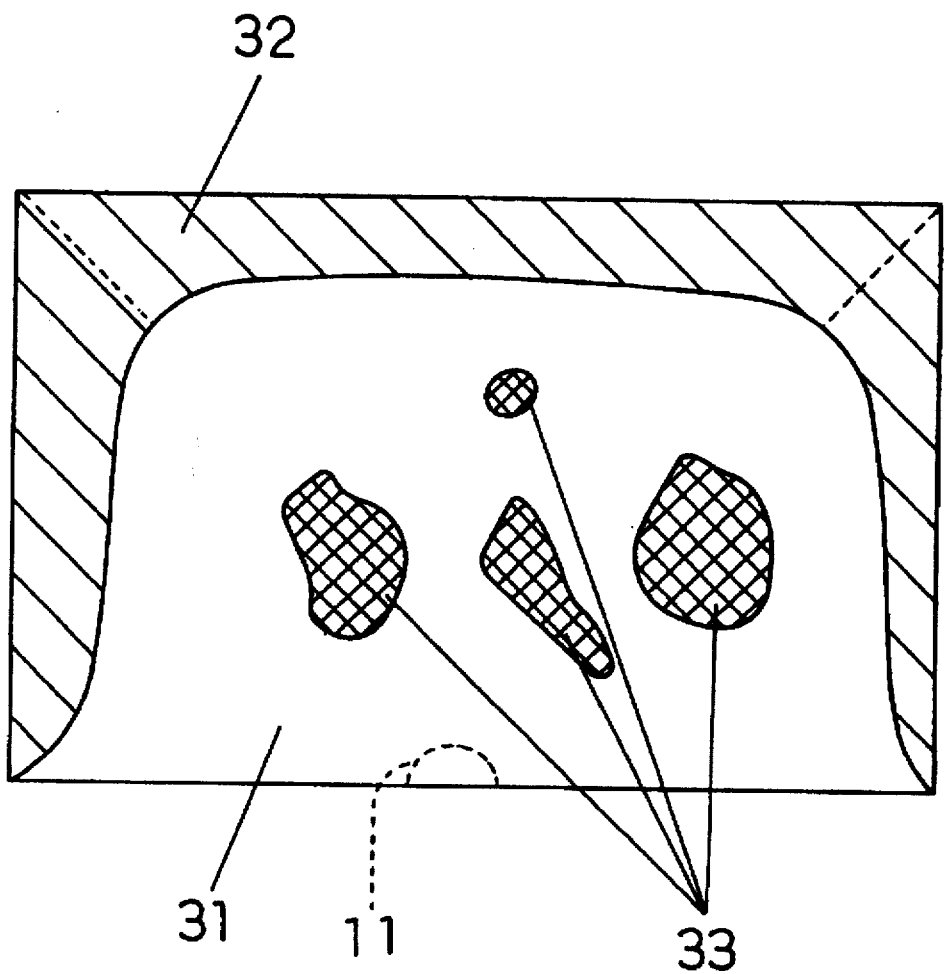
FIG. 3 is a diagram showing human presence regions in a detection region for explaining a human occupancy ratio, according to a human occupancy detection method in a second embodiment of the invention.

FIG. 3 is concerned with a specific example showing human presence regions within the detection region as detected with the above arrangement. It can be seen that only the regions where the presence of humans is detected are restricted. Further, a human presence impossible region 32, such as a wall or the like where the presence of humans is impossible, remains stationary and therefore can be detected simultaneously. The proportion of the human presence regions 33 to the region remaining after subtracting the human presence impossible region 32 from the detection region 31 represents the ratio of human occupancy in the room. That is, a designated space is detected by the infrared sensor, and the human presence regions and the human presence impossible region are extracted from that space; then, the ratio of the area of the thus extracted human presence regions to the area of the human presence possible region is determined as the ratio of human occupancy in that room. Shown in FIG. 3 is a thermo image captured by the infrared sensor 11, which indicates that the sensor 11 is installed centrally in the bottom of the rectangular frame shown in the figure.

When extracting only the human presence regions from the space detected by the infrared sensor, a modeling technique based on fuzzy inference may be used to identify human detected regions. In this case also, the ratio of the area of the thus identified human presence regions to the area of the whole detection region can be determined as the human occupancy ratio.

Figure 12:
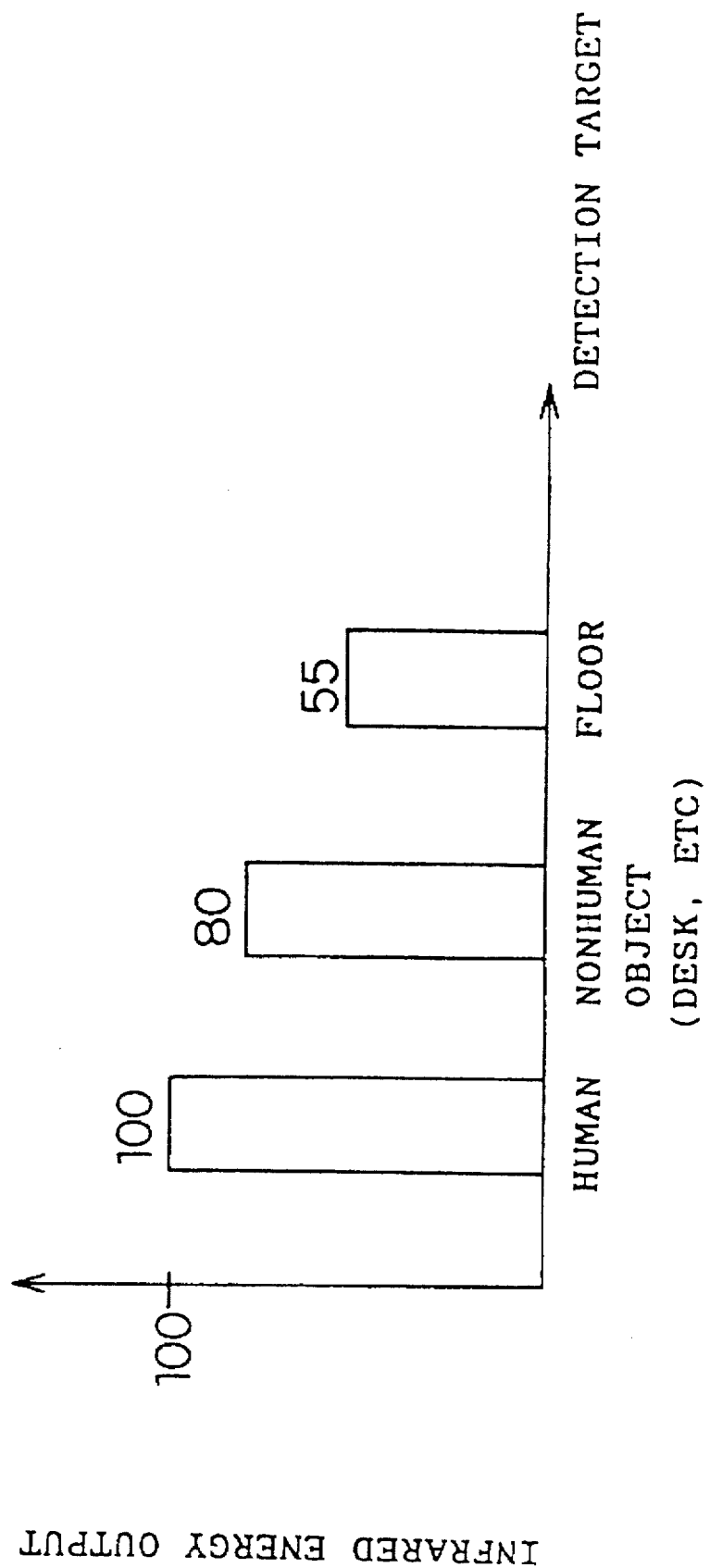
FIG. 12 is a diagram showing infrared energy outputs of a human, a floor, and other objects, according to the embodiments of the invention.

This embodiment is based on the premise that, using the infrared sensor, humans can be distinguished from the floor and other objects (such as a desk, etc.) based on their temperature differences, as shown in FIG. 12, which is a diagram showing the infrared energy outputs of the respective objects, 100 being the infrared energy output of a human body.

(EMBODIMENT 3)

A human occupancy detection method according to a third embodiment of the invention will be described below with reference to drawing.

As in the arrangement shown in FIG. 1, the infrared sensor 11 is installed on the ceiling near the center of the room, and the entire room is set as the detection region 12. In this situation, detection is performed to determine in which region of the room the human 13 exists.

Figure 4:
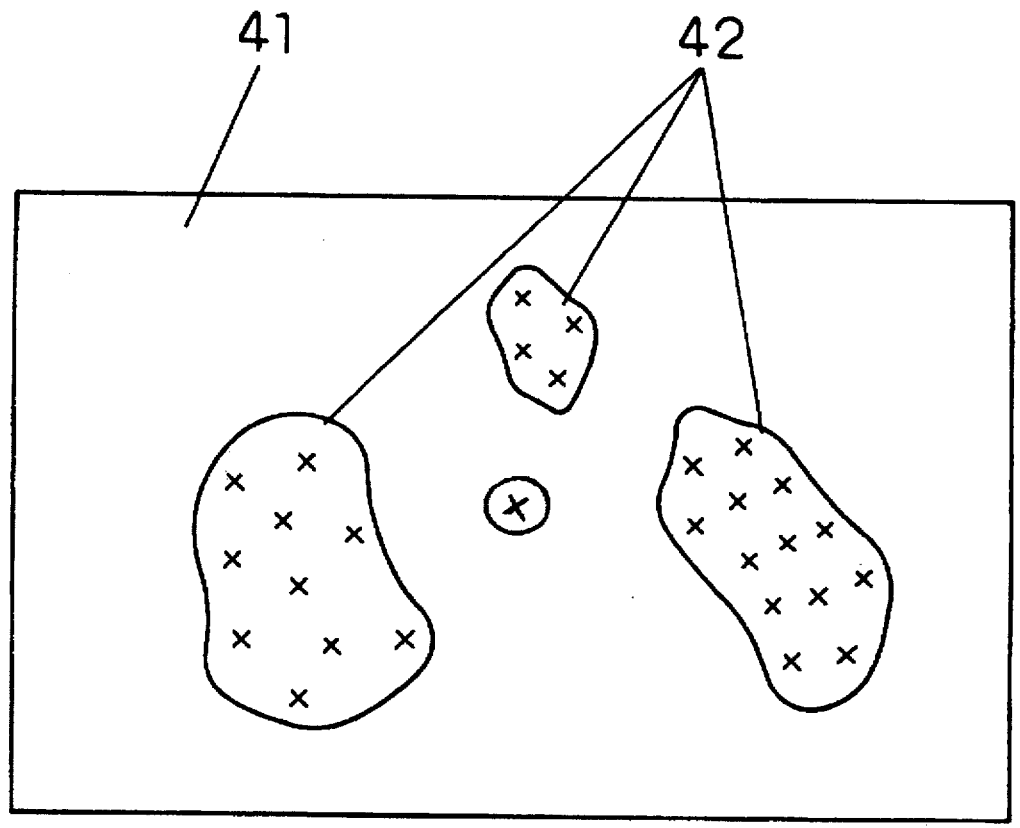
FIG. 4 is a diagram showing human presence regions in a detection region for explaining a human occupancy ratio, according to a human occupancy detection method in a third embodiment of the invention.

FIG. 4 is concerned with a specific example showing human presence regions within the detection region as detected with the above arrangement. It can be seen that only the regions where the presence of humans is detected are restricted. Then, the number of signal intensity peaks is counted to determine approximately how many people there are in each human presence region, that is, the density of the group. Positions of signal intensity peaks within the human presence regions are indicated by x. Each peak position corresponds to the head or face of a human. By counting the number of signal intensity peaks and relating it to the area, the human occupancy ratio calculated from the ratio of areas can be obtained more accurately.

More specifically, a designated space is detected by the infrared sensor, human presence regions are extracted from that space, the number of signal intensity peaks within each of the human presence regions is obtained, the number of signal intensity peaks is related to each of the extracted human presence regions, and the ratio of their areas is determined as the ratio of human occupancy in that room.

We will describe in further detail how the number is related to the area.

The number of peaks within a human presence region can be thought of as representing the density of that region. In one method, the area ratio is calculated after correcting the area of each human presence region according to its density, that is, by multiplying the area of each extracted human presence region by a correction coefficient determined according to the number of peaks, rather than using the area of the human presence regions without correction.

In the example shown in FIG. 4, the human presence regions 42 detected by the infrared sensor 11 arranged as described above are shown, but actually neighboring humans in each region are separated from each other by a certain distance, except the region containing a human (indicated by x in the center of the detection region 41 in the figure) directly below the infrared sensor 11.

However, the distance between humans is not detected, but each region is detected as a cluster of people.

In such a case, therefore, the humans are incorrectly detected as if they are held together in each region without spacing between them, as shown in FIG. 4, although actually they are separated from each other by a certain distance.

This is because, when viewed from the infrared sensor 11, the head of a person nearer to the sensor is so positioned as to conceal the feet of a person behind, so that the lower temperature of the floor or the like, which is necessary to separately detect the body heat temperatures of the people positioned one behind the other, cannot be detected by the infrared sensor 11.

Such incorrect detection tends to occur frequently when the infrared sensor 11 is installed in a corner of a designated space such as a room.

The aim of this embodiment is to increase the accuracy in the calculation of the human occupancy ratio by making corrections by considering the peak counts when the human occupancy ratio cannot be correctly determined by detecting the human presence regions alone.

However, if the number of infrared sensors 11 to be installed and the arrangement of them are properly determined to avoid incorrect detection such as described above, the human occupancy ratio can be obtained with higher accuracy by using the human presence regions alone than by using the peak counts alone.

That is, since a human presence region by its nature can represent such features as the size of each individual human, regions that individual humans actually occupy in a designated space can be detected independently of each other. In other words, an adult and a child, or a sumo wrestler and an ordinary man, can be detected as separate regions they actually occupy in the designated space, not merely as the number of persons present there.

This cannot be distinguished by the peak count method that merely detects the number of persons, and thus, utilizing human presence regions has a great significance.

When extracting only the human presence regions from the space detected by the infrared sensor, the whole detection space may be divided in a matrix form in order to identify human detected regions. In this case also, the ratio of human occupancy in the detected space can be detected from the ratio of their areas.

(EMBODIMENT 4)

A human occupancy detection method according to a fourth embodiment of the invention will be described below with reference to drawing.

Figure 5:
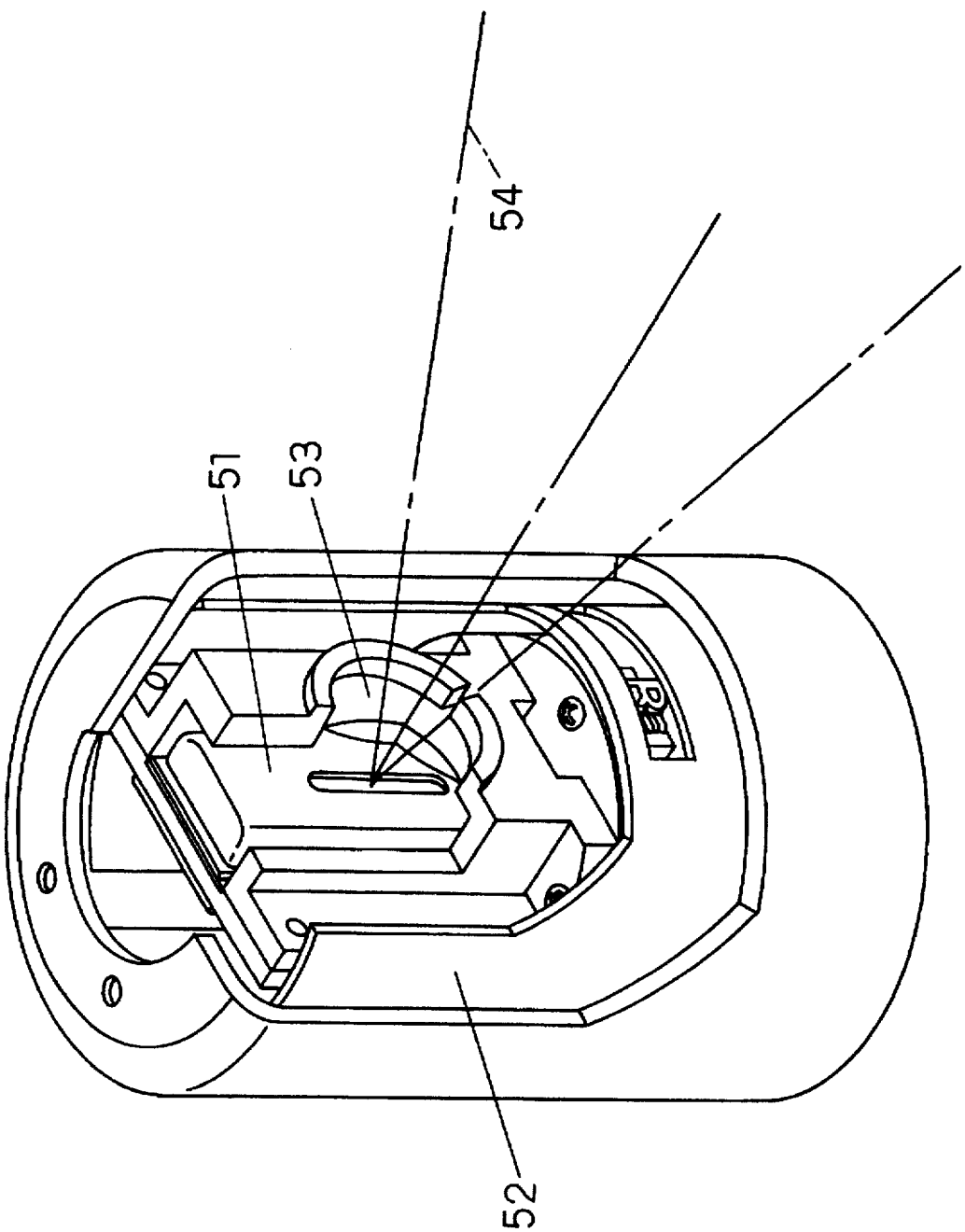
FIG. 5 is a schematic diagram showing an infrared sensor used in a human occupancy detection method in a fourth embodiment of the invention.

FIG. 5 is a schematic diagram showing an infrared sensor used in the human occupancy detection method according to the fourth embodiment of the invention.

The sensor comprises: a pyroelectric element as a pyroelectric infrared line sensor 51 constructed from a plurality of line-like light detectors; an infrared blocking plate disposed on the front side of the pyroelectric element; an infrared-transparent silicon lens 53 for focusing infrared light onto the pyroelectric element and a chopper 52, disposed on the front side of the lens, for periodically interrupting the infrared light 54 incident on the lens. The chopper is mechanically connected to a brushless motor in rotatable fashion.

Suppose the sensor assembly is installed with the longitudinal direction of the infrared array sensor 51 aligned with the vertical direction, and the chopper 52 is now driven. Then, the distribution of radiation heat energy, i.e., the distribution of temperature, can be measured in a longitudinally defined space to which the sensor 51 and the lens 53 are directed. The range of the measurable space depends on the field angle of the lens and the sensor size. Next, the motor is driven and the rotatable part is continuously rotated, causing the sensor with the lens thereon to sweep the target space horizontally. While this is being done, the chopper is driven again to measure the temperature distribution in the next longitudinally defined space. After making the measurements in this manner, the temperature distributions obtained from successively measured directions are combined together by electrical signal processing, to obtain a two-dimensional temperature distribution throughout the target space.

Figure 7:
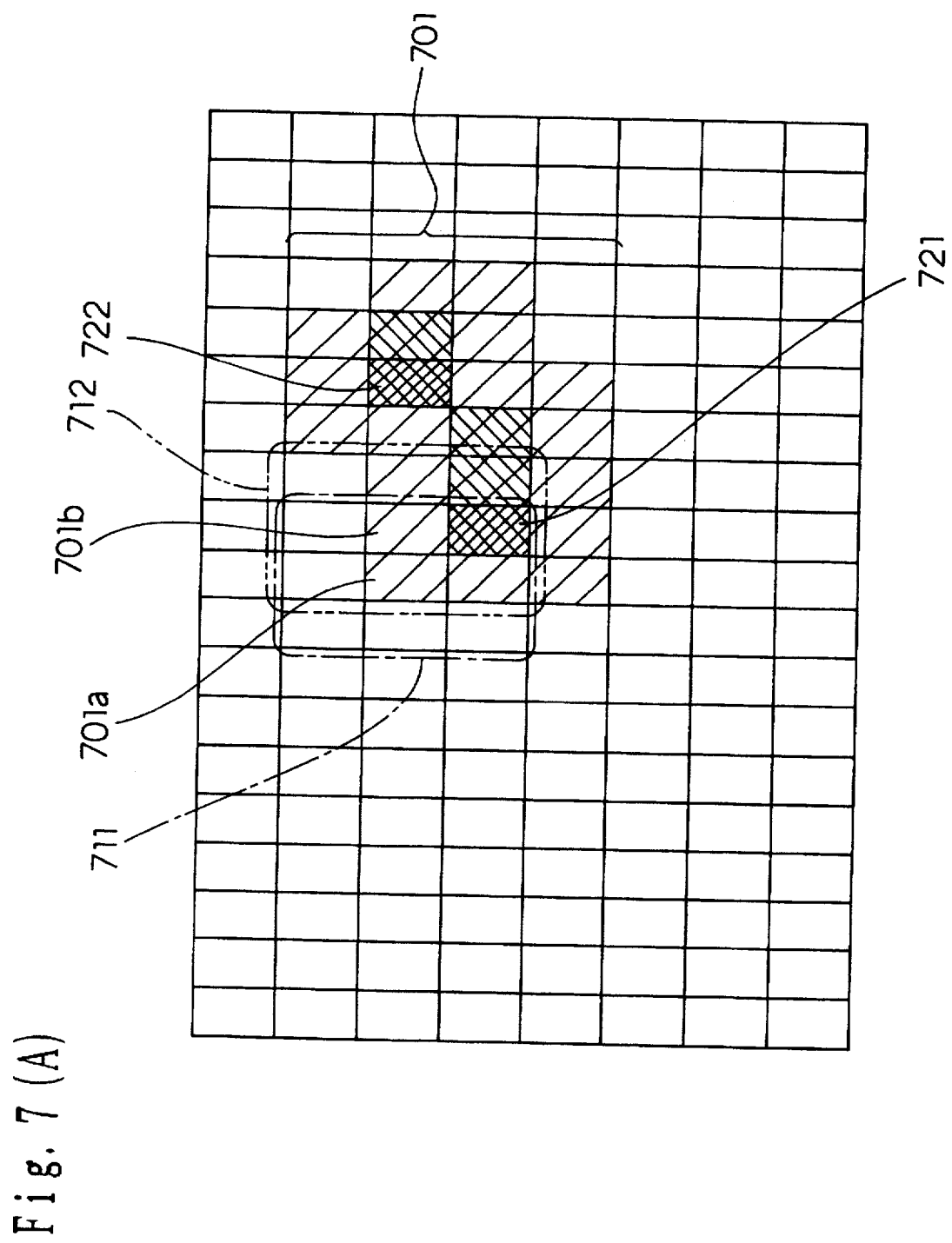
FIG. 7A is a diagram for explaining a method of obtaining a human detected region by using a clustering technique based on fuzzy inference, according to the fourth embodiment of the invention.
FIG. 7B is a diagram showing human detected regions according to the human occupancy detection method in the fourth embodiment of the invention.
Figure 7B:
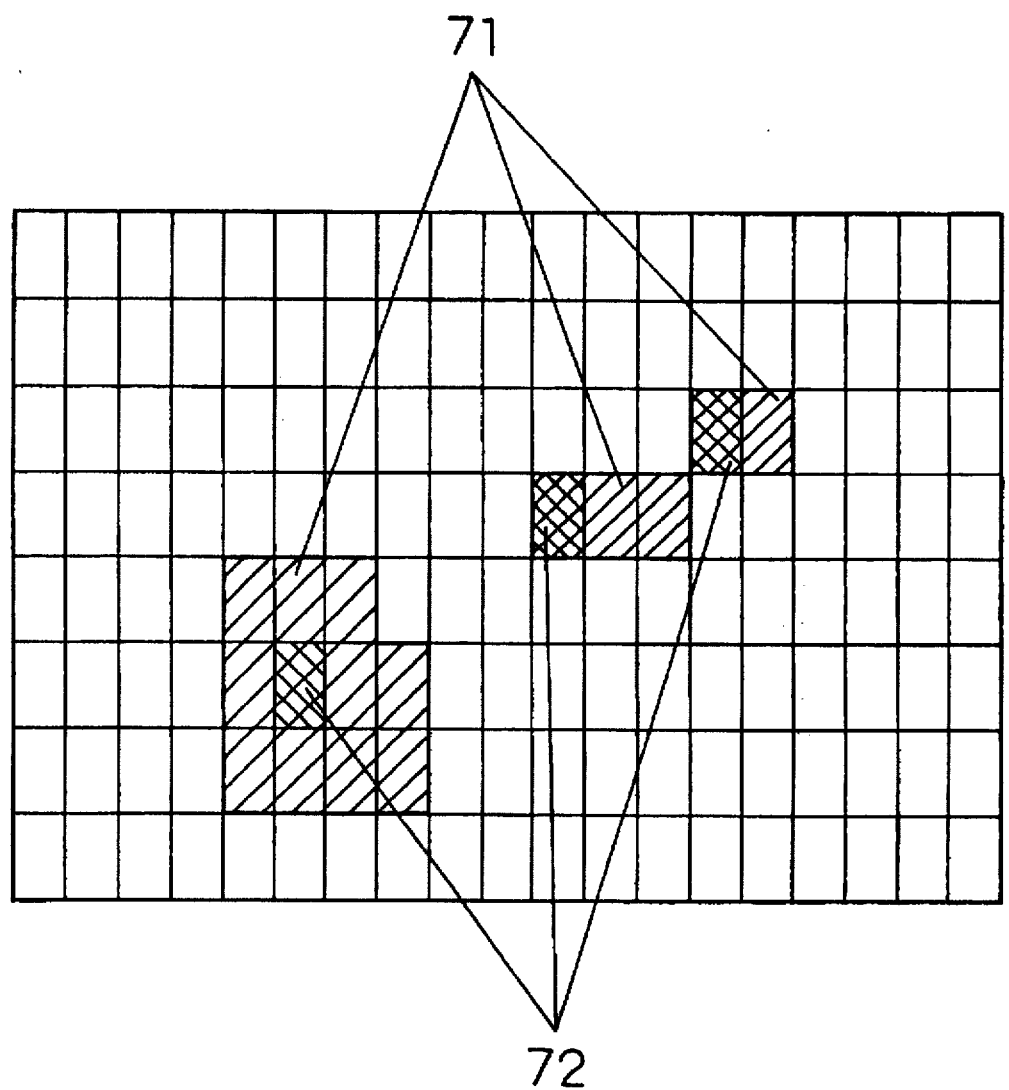

By dividing the space in a matrix form in this manner, regions where the presence of humans is detected can be identified. FIG. 7B shows a specific example showing the human presence regions 71 and local temperature peaks (local peaks) 72 obtained in the above process.

In this example, the human presence regions are obtained by using a clustering technique based on fuzzy inference. A specific example of this process will be described below.

Figure 6:
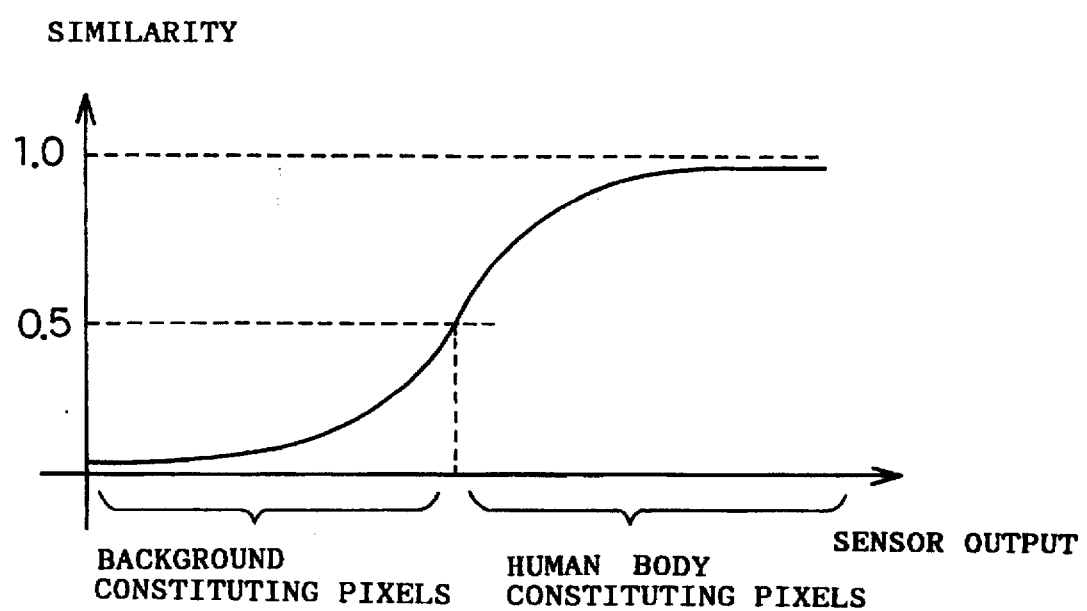
FIG. 6 is a diagram for explaining clustering by fuzzy inference according to the human occupancy detection method in the fourth embodiment of the invention.

FIG. 6 is a diagram showing the sensor-output versus similarity-score relationship used in the clustering technique based on fuzzy inference according to the human occupancy detection method of the invention.

(1) In a thermo image, a human body region consists of pixels of relatively high temperature. Hence, pixels whose temperature (average temperature) is higher than a predetermined threshold temperature are extracted, and the region consisting of such pixels is determined as a tentative human presence region 701. This tentative human presence region 701 is indicated by dashed lines in FIG. 7A. FIG. 7A is a diagram showing the state preparatory to the next step where the human presence regions, etc. shown in FIG. 7B are obtained. For simplicity of explanation, FIG. 7A shows only the region corresponding to the right half of FIG. 7B.

From this tentative human presence region 701, more precisely defined human presence regions and the number of persons present in each region are obtained in the following procedure.

(2) First, one pixel is selected from within the tentative human presence region 701, and the selected pixel is determined as an attention pixel 701a. Then, within a 3×3-pixel region 711 with the attention pixel 701a at its center, the highest-temperature pixel is located which is then recorded as a local peak pixel in a prescribed memory (not shown). In the 3×3-pixel region 711 shown here, the pixel in the lower right corner is recorded as the local peak pixel 721.

(3) Next, the similarity score of this local peak pixel 721 is determined as 1.0, and using FIG. 6, the similarity scores of the other pixels in the same 3×3-pixel region 711 are obtained. From among the pixels whose similarity scores are thus obtained, the pixels for which the similarity score is 0.5 or greater are selected as pixels forming a human presence region.

(4) Further, a pixel 701b, different from the pixel 701a selected in step (2), is selected from within the same tentative human presence region 701, and this pixel is determined as an attention pixel. Then, the above steps (2) and (3) are performed on a 3×3-pixel region 712 with the attention pixel at its center. The local peak pixel obtained here is located at the center in the bottom row of the pixel region 712, which coincides with the local peak pixel 721 obtained in the previous step (2). All of the other pixels in the same tentative human presence region 701 are sequentially set as an attention pixel, and the above process is repeated.

If there is more than one tentative human presence region, the steps (2) to (4) are performed on all tentative human presence regions.

(5) The local peak pixels, 721, 722, . . . , are thus obtained, the total number of local peak pixels corresponding to the number of persons. Every region consisting of pixels selected from the tentative human presence region as pixels constituting a human presence region, can be detected as a human presence region.

From the thus obtained human detected region (human presence region) and the number of peaks in the human detected region, the area ratio with respect to the whole detection region is obtained from which the degree of congestion is estimated.

When extracting only the human presence regions from the space detected by the infrared sensor, a modeling technique based on fuzzy inference may be used to identify the human presence regions. In this case also, the ratio of the area of the thus identified human presence regions to the area of the whole detection region can be determined as the human occupancy ratio. This can be accomplished by replacing the operation performed using the clustering technique, described in the above step (3), by the modeling technique based on fuzzy inference.

As described above, the present embodiment is concerned with a method of detecting the ratio of human occupancy in a designated space, and comprises an infrared array sensor constructed from a plurality of detector elements arranged in an array, a chopping means for periodically interrupting infrared radiation incident on the sensor, and a driving means for turning an aiming direction of the infrared array sensor in a stepwise manner, wherein after making measurements on the outputs of the detector elements for each aiming direction, the aiming direction is turned through a prescribed angle by means of a motor, the measurements are sequentially repeated, and after finishing the measurements for a final aiming direction, the motor is rotated backward to the initial aiming direction, thereby extracting a human presence region from the whole detection region, and thus detecting the ratio of human occupancy in the detected space from the ratio of their areas. The present embodiment thus provides a method that can detect and judge the ratio of human occupancy in a designated space by detecting the presence of humans easily and reliably as compared to the prior known method.

Next, an example of an experiment conducted using the above method of detecting the number of persons from the local peaks will be described. The aim of the experiment was to detect the number of persons present in a meeting room by using an infrared sensor.

(A) Data collection method

Figure 13:
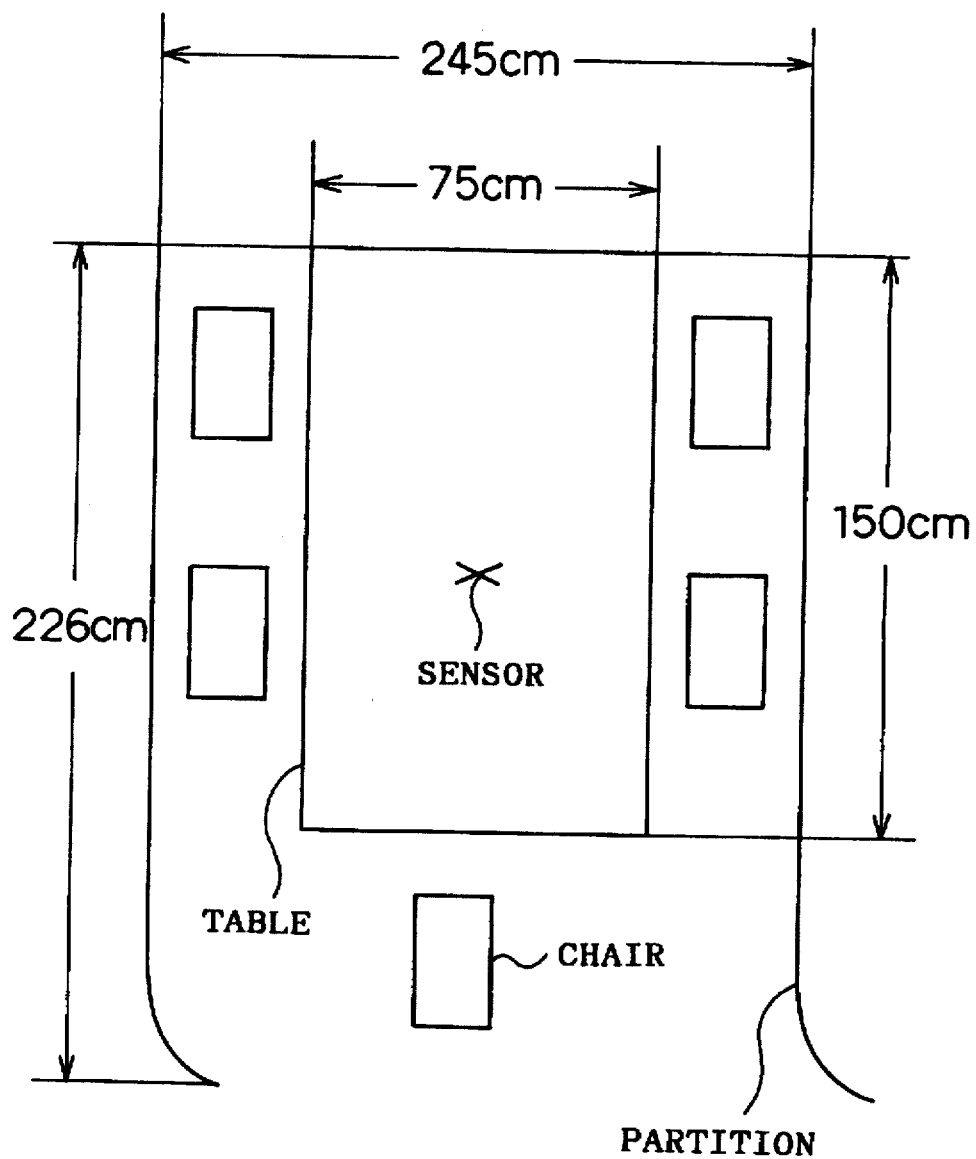
FIG. 13 is a top plan view showing a meeting room and a sensor installation position in an experiment conducted according to the invention.

1) Number of persons actually residing (every 3 minutes): Visual counting by a person in the meeting room 2) Number of residing persons by automatic measurement (every 3 minutes): Printer output from control terminal 3) Output data of A/D converter: Collected by personal computer (B) Installation conditions A rotary scanning-type sensor head and an 8-element sensor were used. Chopping frequency was 10 Hz, and for each detection field of view, measurements were made for four seconds. The chopper was driven at periodic intervals of about one minute. The interior dimensions of the meeting room where detection of human presence was made are shown in FIG. 13. The height to the ceiling was 228 cm. Using a sensor mounting jig, the sensor was installed on an overhead air-conditioning outlet at a height of 223 cm and directly above the center of a space enclosed by a partition. It was also decided that the sensor should be panned along the longitudinal direction of the table.

The sensor was designed with the detection field of view determined on the premise that the sensor was used to detect sitting persons. The viewing angle along the sensor panning direction was set at 84 degrees to avoid detecting persons passing in the hall outside the room. The setting was made by software, without making hardware modifications. As for the viewing angle perpendicular to the sensor panning direction, a conventional lens with a viewing angle of 64 degrees was used to prevent the adjoining meeting room and the partition from being brought into the field of view.

(C) Results of the experiment

As shown in Table 1, the following results were obtained from the experiment. For the presence or absence of people, an accuracy of 98.9% was achieved, except immediately after switching of people. All incorrect judgements concerned cases where human presence was erroneously judged as no humans present. There were no cases where it was judged that a human was present though actually no humans were present. As for the accuracy of presence judgement, an accuracy of 74.0% was obtained for ±0 person, and 96.1% for ±1 person. Overlapping of people was judged relatively correctly, though the head count tended to be judged smaller than the actual number, the percentage of −1 person being as high as 21.1% of all the judgements.

TABLE 1

Overall Judgement Results of Head Counts

| | | Absence Judgement | | | | Presence Judgement | | | | | | | | Sub | Grand |
|---|---|---|---|---|---|---|---|---|---|---|---|---|---|---|---|
| | | O | X | Others | Total | −4 | −3 | −2 | −1 | 0 | +1 | +2 | +3 | Total | total |
| January 19 | Presence/absence Detection Sensor 1 | 21 | 0 | 0 | 21 | 0 | 0 | 0 | 8 | 52 | 1 | 0 | 0 | 61 | 82 |
| | Presence/absence Detection Sensor 2 | 52 | 0 | 0 | 53 | 0 | 0 | 0 | 2 | 27 | 0 | 0 | 0 | 29 | 82 |
| January 20 | Presence/absence Detection Sensor 1 | 40 | 1 | 5 | 46 | 0 | 1 | 5 | 36 | 80 | 0 | 0 | 0 | 122 | 168 |
| | Presence/absence Detection Sensor 2 | 84 | 1 | 5 | 90 | 0 | 2 | 6 | 27 | 39 | 4 | 0 | 0 | 78 | 168 |
| January 24 | Presence/absence Detection Sensor 1 | 25 | 2 | 5 | 32 | 0 | 0 | 0 | 17 | 63 | 2 | 0 | 0 | 82 | 114 |
| | Presence/absence Detection Sensor 2 | 52 | 0 | 3 | 55 | 1 | 0 | 2 | 27 | 27 | 1 | 1 | 0 | 59 | 114 |
| January 25 | Presence/absence Detection Sensor 1 | 65 | 0 | 5 | 70 | 0 | 0 | 0 | 11 | 40 | 0 | 0 | 0 | 51 | 121 |
| | Presence/absence Detection Sensor 2 | 65 | 1 | 6 | 72 | 0 | 0 | 0 | 7 | 42 | 0 | 0 | 0 | 49 | 121 |
| January 30 | Presence/absence Detection Sensor 1 | 50 | 1 | 3 | 54 | 0 | 0 | 1 | 11 | 95 | 0 | 0 | 0 | 107 | 161 |
| | Presence/absence Detection Sensor 2 | 73 | 1 | 1 | 75 | 0 | 0 | 14 | 25 | 47 | 0 | 0 | 0 | 86 | 161 |
| January 31 | Presence/absence Detection Sensor 1 | 94 | 1 | 4 | 99 | 0 | 0 | 0 | 4 | 77 | 1 | 0 | 0 | 82 | 181 |
| | Presence/absence Detection Sensor 2 | 120 | 0 | 5 | 125 | 0 | 0 | 0 | 7 | 49 | 0 | 0 | 0 | 56 | 181 |
| | | 741 | 8 | 42 | 792 | 1 | 3 | 28 | 182 | 638 | 9 | 1 | 0 | 862 | 1654 |
| | | | | | Accuracy Rate (%) | 0.12 | 0.35 | 3.25 | 21.11 | 74.01 | 1.04 | 0.12 | 0 | 100 | |

The same experiment was conducted using different conditions. This will be described below.

(A) Conditions of experiment

Sensor used: Rotary scanning-type sensor
  Detection field of view: 64°×120° (divided into 8×40)
  Sensor installation position: Directly above target region
  Sensor installation height: 235 cm
  Subjects: 6 people maximum (5 adult men and one adult woman)
  Clothes: Men—Winter uniform, Woman—White gown
  Temperature: 16° to 27° C.
  Floor surface: Resin (B) Results of study 1) Study of threshold value for judgement of 0 person While varying the temperature in the room, humans located at various positions were measured, and the average value of the sensor outputs for human body regions was calculated from the obtained sensor matrix data. The average sensor output value was able to be expressed by a linear equation in the form of a function of sensor internal temperature. Using this function, the presence or absence of people was judged. An accuracy of 100% was obtained.

2) Tracking of sensor output for a chair after its occupant left

Generally, immediately after a person has left his seat, the seat is still warm because of his body heat. It was therefore feared that such a seat might be erroneously judged as a person. We monitored the sensor output for a chair for some time immediately after its occupant had left the chair. It was found that the sensor output dropped below the threshold value in about one minute. Even when it was erroneously detected as a human body region, the noise elimination processing hereinafter described effectively prevented it from being erroneously judged as a human body.

3) Determination of pixel count for noise elimination

A number of heat radiating objects that were likely to be erroneously judged as humans were arranged, and their pixel counts were extracted from the sensor matrix data. The heat radiating objects included a cigarette, a hand placed on the table, and a notebook-size personal computer. The cigarette occupied one to three pixels, the hand two to four pixels, and the notebook computer three to six pixels. When the threshold pixel count for noise elimination was set to 7 or less, the number of persons was fairly correctly judged as 5.

4) Study of pixel count forming a human body

While varying the temperature in the room, measurements were made under various conditions, with the subjects changing their postures, overlapping one behind another, etc., and pixels forming a human body were extracted. The result showed that the pixel count for one human body seldom exceeded 20 to 25, permitting fairly correct judgement of overlapping of persons. By dividing the total pixel count by the pixel count per person, with the pixels judged in relation to the sensor internal temperature, an accuracy of 100% was obtained with a tolerance of ±1 person.

Next, we will describe a specific example in which the human occupancy ratio is obtained without using the local peaks as described above.

First, a two-dimensional thermo image of a designated space is captured using an infrared sensor. From the thermo image, regions of pixels whose values are larger than a predetermined threshold value are obtained, and of these regions, small regions consisting, for example, of two or less pixels are judged as noise and are therefore eliminated (STEP 161 and 162). Human detected regions are identified in this manner (STEP 163). Corrections are made on the thus obtained human detected regions by using coefficients, $\alpha$ and $\beta$, hereinafter described (STEP 164).

Figure 15:
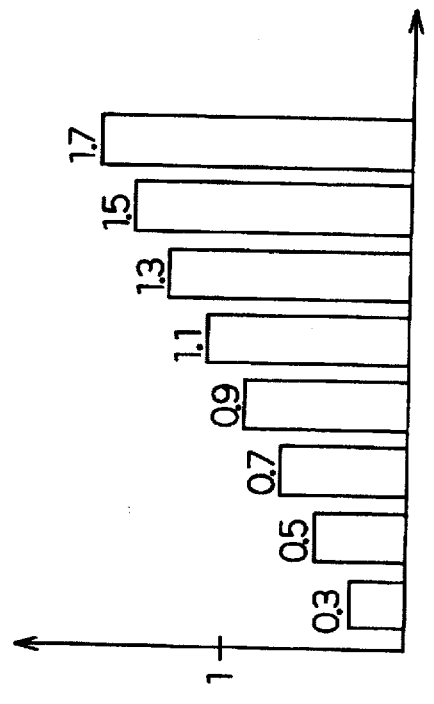
FIG. 15 is a diagram showing the relationship between correction coefficient $\beta$ and relative distance from sensor installation position to actual position of detection target, corresponding to pixels in a thermo image, according to the example of the invention.
Figure 14:
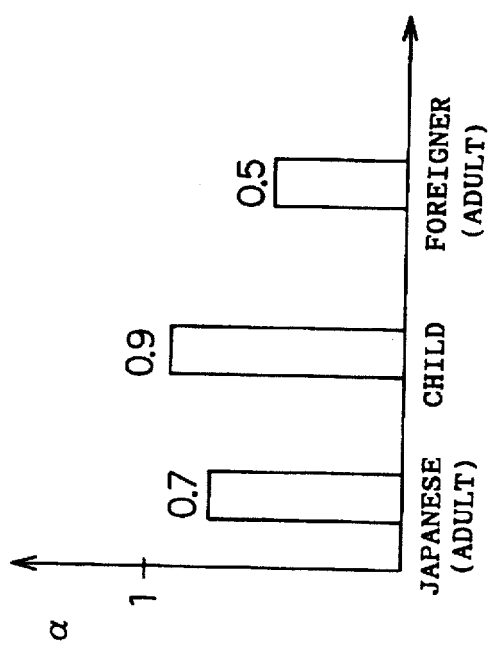
FIG. 14 is a diagram showing the relationship between correction coefficient $\alpha$ and human body size according to an example of the invention.

As shown in FIGS. 14 and 15, $\alpha$ is a coefficient for compensating for human body size, and $\beta$ is a coefficient for compensating for the distance from the sensor to the detected human body.

In FIG. 14, the value of $\alpha$ is set larger for a child than for an adult (Japanese) for the following reason. At the same position on the floor, when the subject to be detected is a child, the subject is at a longer distance from the sensor than when the subject is an adult, so that the proportion of the area the child occupies in the thermo image is smaller than the actual proportion of the area of its presence region to the floor area. The value of $\alpha$ is so set as to compensate for this difference and to bring the proportion closer to the actual area proportion. It is assumed here that the sensor is mounted on the ceiling.

On the other hand, the value of $\beta$ increases with increasing distance between sensor and human body.

Figure 16:
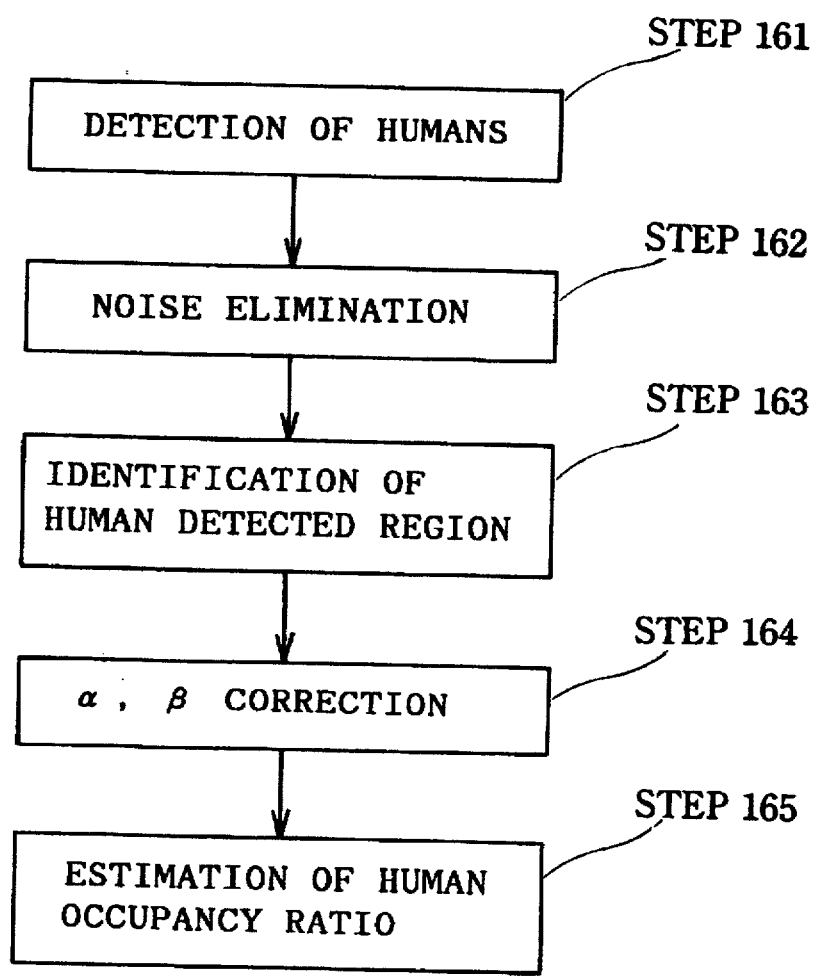
FIG. 16 is a flow diagram showing a process for determining human occupancy ratio by utilizing the correction coefficients $\alpha$ and $\beta$ according to the example of the invention.

Using the coefficients $\alpha$ and $\beta$, the ratio of the human presence region to the human presence possible region in the detected range can be corrected (STEP 163 and 164), and therefore, the ratio of human occupancy in a designated space can be obtained accurately (STEP 165). A flow diagram illustrating the above processing method is shown in FIG. 16.

We will describe below another specific example in which the human occupancy ratio is obtained by using the method that detects the number of persons from the local peaks as earlier described.

In this specific example, after correcting the human presence region by coefficients $\alpha$ and $\beta$, as described in the foregoing example (STEP 161–164), the number of local peaks in the human presence region is detected, and this number is made to correspond to the number of persons (STEP 171 and 172). For the number of local peaks, a $\gamma$ value as a numeric value specific to a particular type of human body is considered (see Table 2) (STEP 173). Table 2 will be explained. Table 2 shows the proportion (%) of an area occupied by one person to the total area of the floor which is a specific detection target region where a sensor is installed. This proportion varies depending on the type of human body, that is, whether the subject is a Japanese or a foreigner or a child (the value is thus specific to a particular type of human body).

TABLE 2

| Type of human body | τ value (%) |
|---|---|
| Japanese (adult) | 2 ± 0.5 |
| Child | 1 ± 0.5 |
| Foreigner (adult) | 3 ± 0.5 |

Figure 17:
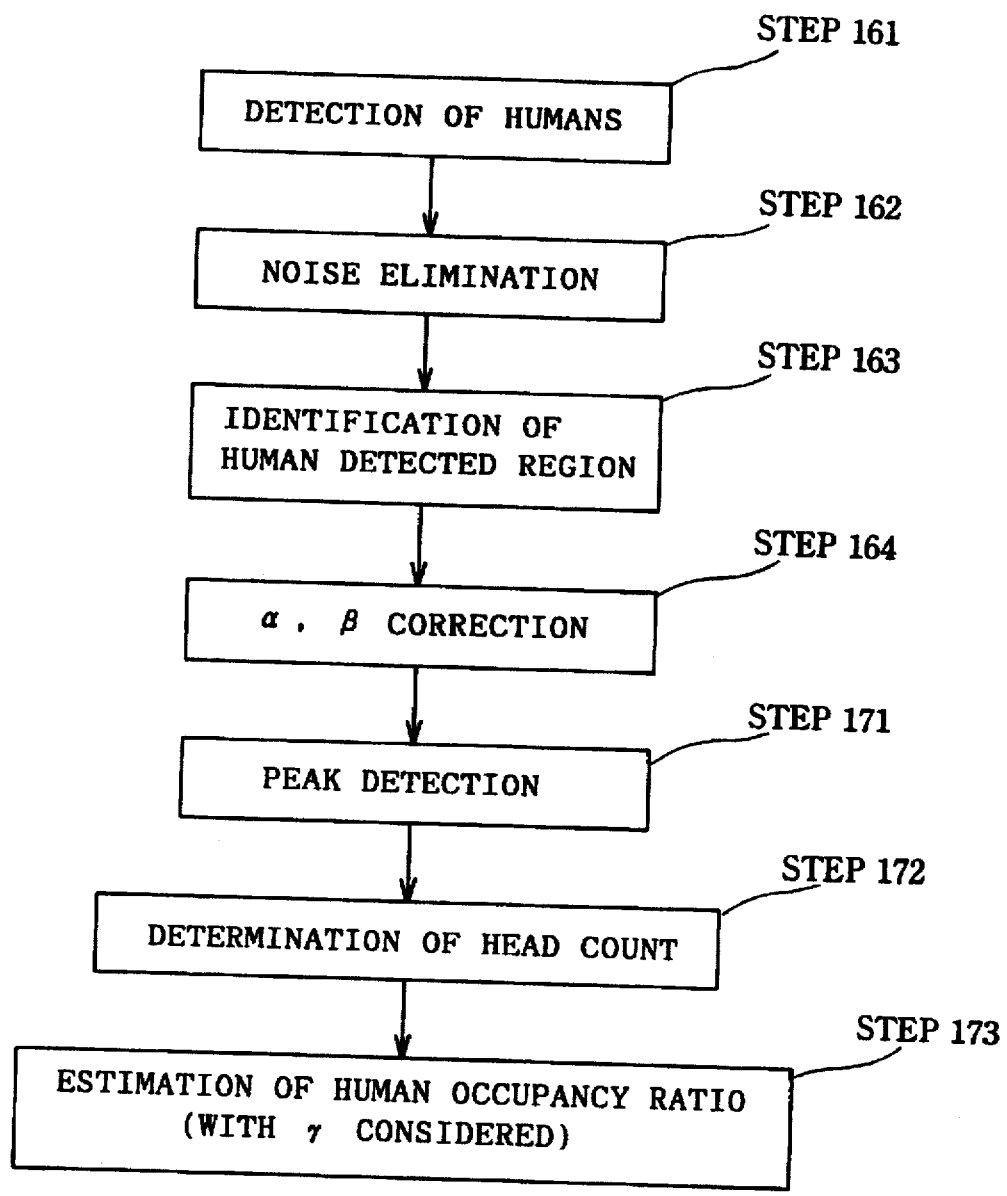
FIG. 17 is a flow diagram showing a process for determining human occupancy ratio according to another example of the invention.

More specifically, after compensating by $\alpha$ and $\beta$, the number of peaks in the human presence region is detected, and this number is determined as the number of persons existing in that region. Then, the $\alpha$- and $\beta$-corrected human occupancy ratio is divided by the number of persons thus obtained. If the resulting value is within the tolerance of ±0.5 of the numeric value (see Table 2) specific to the human body detected, then the obtained human occupancy ratio is adopted (STEP 173). If the error is larger than ±0.5, then the correction coefficient $\alpha$ is changed from one body type to another (for example, from Japanese adult to child), and the human occupancy ratio is recalculated in the same manner as described above. The obtained human occupancy ratio is then divided by the number of persons (i.e., the number of local peaks). If the resulting value is within the specified tolerance (±0.5) of the numeric value specific to the corresponding body type, the α- and β-corrected value is determined as the human occupancy ratio. A flow diagram illustrating the above processing method is shown in FIG. 17.

(EMBODIMENT 5)

A human occupancy detection system according to another embodiment of the invention will be described below with reference to drawing.

Figure 8:
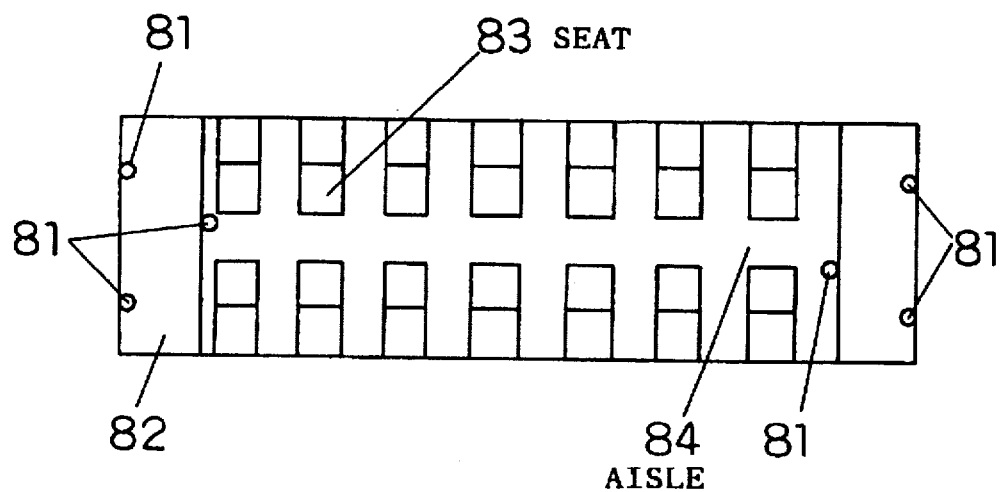
FIG. 8 is a schematic diagram showing a top plan view of a railroad car equipped with a human occupancy detection system according to a fifth embodiment of the invention.

FIG. 8 is a schematic diagram showing a top plan view of a railroad car equipped with the human occupancy detection system according to the embodiment of the invention.

Infrared sensors 81 are installed in a vestibule 82 or other spaces in a train. The target space is detected by the infrared sensors, and human detected regions are extracted from the whole detection region; the ratio of human occupancy in the detected space inside the car or in the vestibule can thus be determined from the ratio of the area of the extracted human presence regions to the area of the whole detection region.

Figure 9:
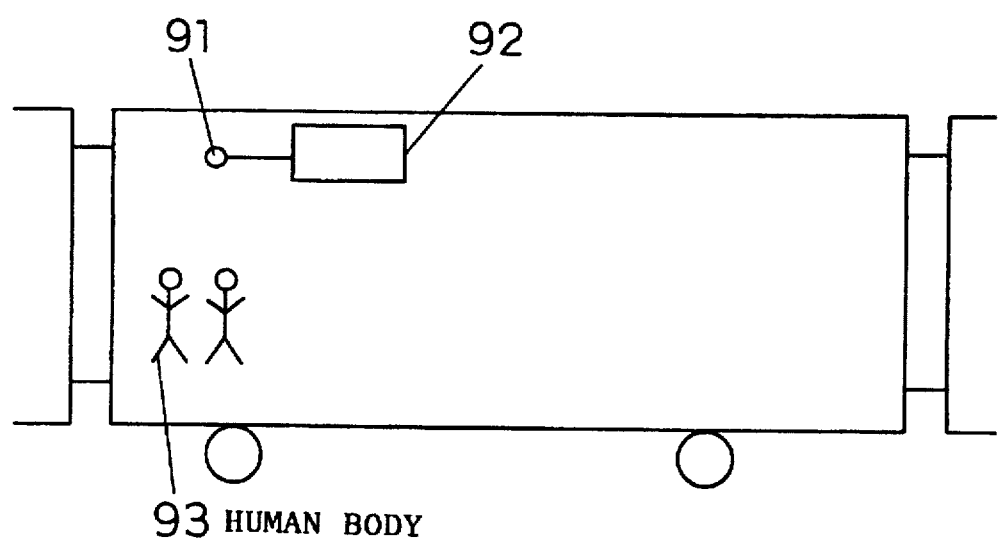
FIG. 9 is a schematic diagram showing a side view of the railroad car equipped with the human occupancy detection system according to the fifth embodiment of the invention.

FIG. 9 is a schematic diagram showing a side view of the car equipped with the human occupancy detection system of the invention.

The human occupancy ratio detected by an infrared sensor 91 is displayed on a display device 92 for viewing by people outside the train. Better service can thus be provided to passengers since the occupancy rate of each car can be indicated to the passengers before they get into the train.

When extracting human presence regions from the space inside the car or in the vestibule detected by the infrared sensors, a clustering technique based on fuzzy inference may be used to identify the human presence regions. In this case also, the human occupancy ratio can be detected from the ratio of their areas.

(EMBODIMENT 6)

A human occupancy detection system according to another embodiment of the invention will be described below with reference to drawing.

Figure 10:
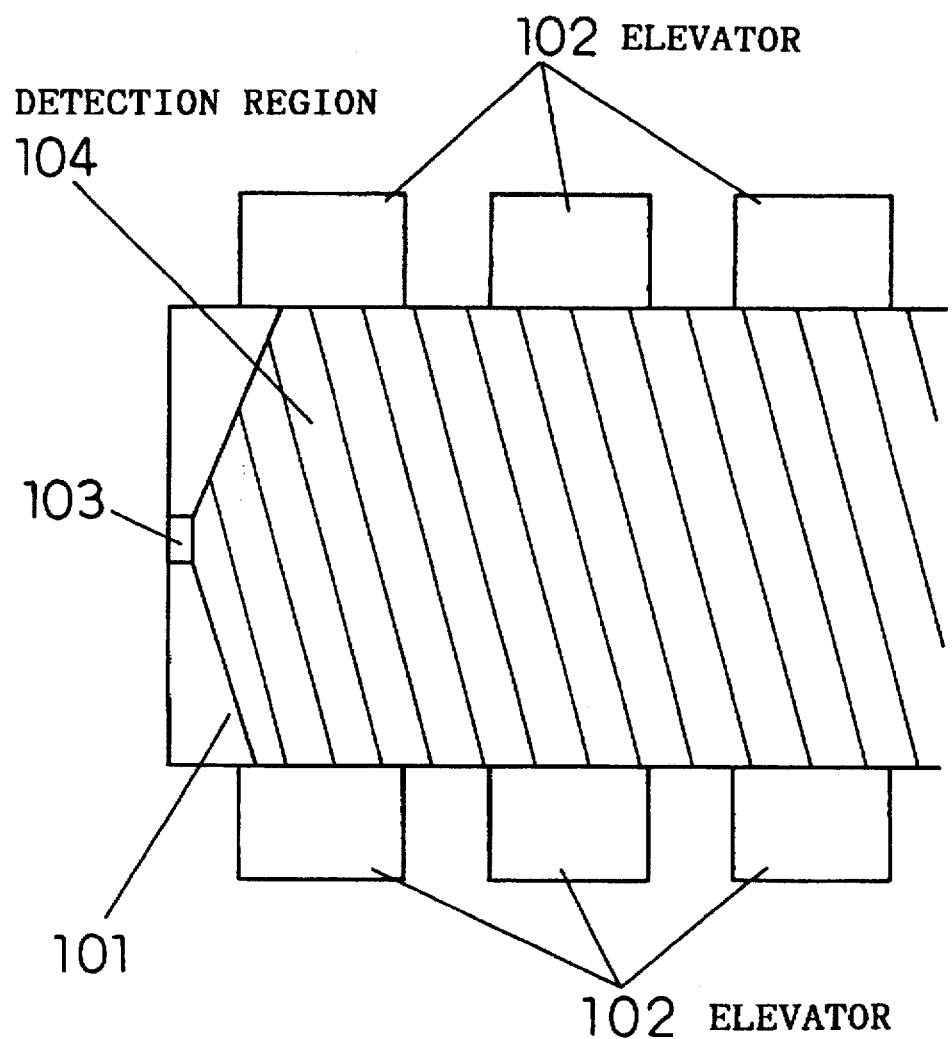
FIG. 10 is a schematic diagram showing a top plan view of an elevator hall equipped with a human occupancy detection system according to a sixth embodiment of the invention.

FIG. 10 is a schematic diagram showing a top plan view of an elevator hall equipped with the human occupancy detection system according to the embodiment of the invention.

To detect the ratio of human occupancy in the elevator hall 101, an infrared sensor 103 is installed on the ceiling of the hall. The target space is scanned by the infrared sensor, and human detected regions are extracted from the whole detection region; the ratio of human occupancy in the detected space within the elevator hall can thus be detected from the ratio of the area of the extracted human presence regions to the area of the whole detection region.

Furthermore, by feeding back the thus detected human occupancy ratio on each floor to the elevator control system, and by controlling the elevators so that they stop preferentially at floors where the human occupancy ratio is high, smooth operation of the elevators can be ensured.

When extracting human presence regions from the space of the elevator hall detected by the infrared sensor, a modeling technique based on fuzzy inference may be used to identify the human detected regions. In this case also, the human occupancy ratio can be detected from the ratio of their areas.

(EMBODIMENT 7)

A human occupancy detection system according to another embodiment of the invention will be described below.

An infrared sensor, such as the one shown in FIG. 5, is installed on a ceiling of a building such as a theater or an exhibition hall. The target space is scanned by the infrared sensor, and human detected regions are extracted from the whole detection region; the ratio of human occupancy in the detected space within the building can thus be detected from the ratio of the area of the extracted human presence regions to the area of the whole detection region.

Furthermore, by feeding back the thus detected human occupancy ratio to air-conditioning or illumination control systems for the detected space, an optimum environment or optimum conditions can be provided to the people gathered in that place.

When extracting human presence regions from the space of the theater or exhibition hall scanned by the infrared sensor, the whole detection space may be divided in a matrix form in order to identify the human detected regions. In this case also, the human occupancy ratio can be detected from the ratio of their areas.

(EMBODIMENT 8)

A human occupancy detection system according to another embodiment of the invention will be described below with reference to drawing.

Figure 11:
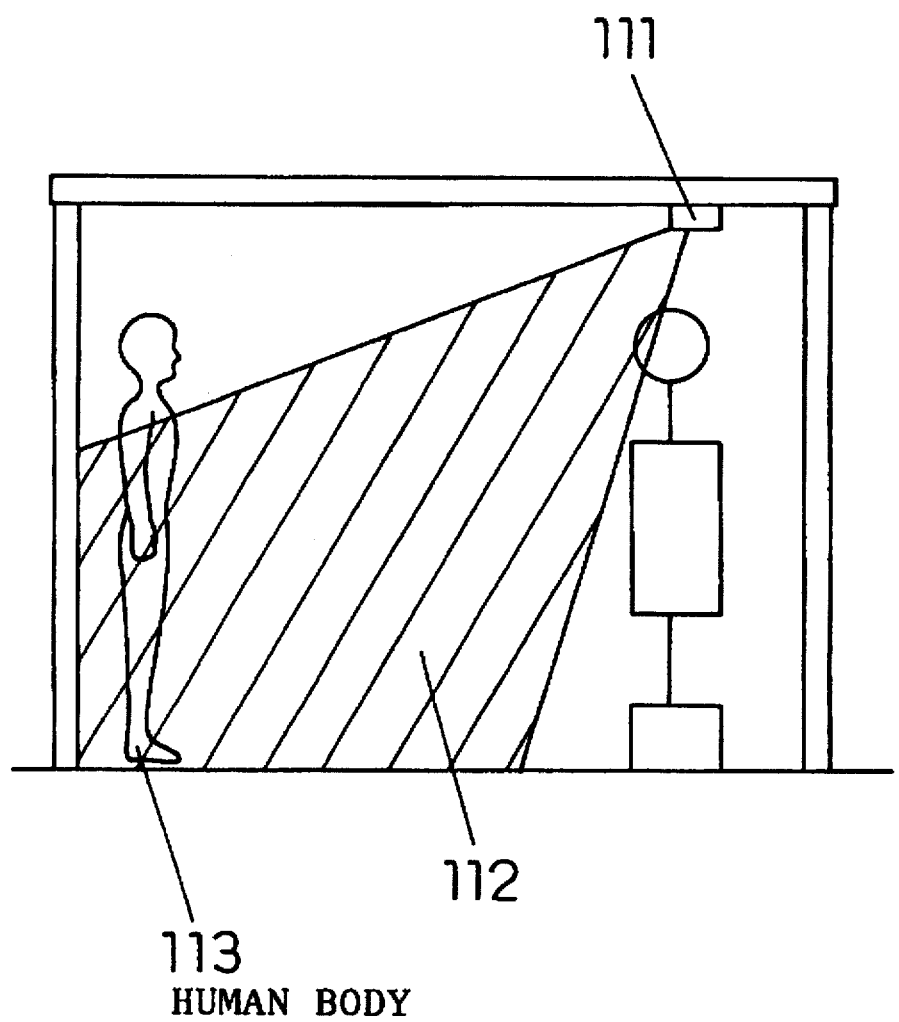
FIG. 11 is a schematic diagram showing a side view of a bus stop equipped with a human occupancy detection system according to an eighth embodiment of the invention.

FIG. 11 is a schematic diagram showing a side view of a bus stop equipped with the human occupancy detection system according to the embodiment of the invention.

An infrared sensor 111 for detecting people waiting for a bus is installed on the ceiling of the bus stop. The detection region 112 is scanned by the infrared sensor 112, and human detected regions are extracted from the whole detection region; the ratio of human occupancy in the detected space at the bus stop can thus be detected from the ratio of the area of the extracted human presence regions to the area of the whole detection region.

By signalling the thus detected human occupancy ratio to bus drivers, smooth bus service can be provided.

The infrared sensor used here may be one that comprises an infrared array sensor constructed from a plurality of detector elements arranged in an array, a chopping means for periodically interrupting infrared radiation incident on the sensor, and a driving means for turning the aiming direction of the infrared array sensor in a stepwise manner, wherein after making measurements on the outputs of the detector elements for each aiming direction, the aiming direction is turned through a predetermined angle by means of a motor, the measurements are sequentially repeated, and human detected regions are extracted from the whole detection regions, thereby detecting the ratio of human occupancy in the detected space from the ratio of their areas.

According to the above-described embodiments, a human presence region, a human presence impossible region, etc. are detected using an infrared sensor capable of detecting humans, and the ratio of the area occupied by the human presence region to the area of the whole detection region is obtained and is determined as the ratio of human occupancy in the target space. Further, by obtaining the number of signal strength peaks within the human presence region, the density of that human presence region can be found, which serves to increase the accuracy in the detection of the human occupancy ratio. Furthermore, when identifying a human presence region and even obtaining the number of persons present therein, a clustering technique or a modeling technique based on fuzzy inference may be used, or alternatively, the whole space may be divided in a matrix form. In this way, quick, accurate, and reliable detection of a human occupancy ratio can be achieved with relative ease and at low cost. Specifically, by using a rotary-type pyroelectric infrared sensor and thereby dividing the whole space in a matrix form, an accurate and reliable human occupancy ratio can be obtained.

Further, according to the human occupancy detection system constructed from a combination of an infrared sensor and various control devices, the ratio of human occupancy in a public transport vehicle, such as a commuter train, or inside a building is detected and judged, and the result is fed back to responsible control systems, to help to create a comfortable space or conditions for humans. Specifically, in the case of a commuter train, passengers can be alerted to the degree of crowdedness of the train, and in the case of an elevator hall, information about the volume of people waiting for an elevator is fed back to the elevator control system, the effect of this being to create comfortable conditions for humans. Moreover, in the case of a building such as a theater or an exhibition hall, illumination and air-conditioning systems can be controlled effectively by measuring the ratio of human occupancy in the designated space of the building. Likewise, by measuring the ratio of human occupancy at a bus stop, bus schedules can be implemented more smoothly, which also greatly contributes to improving customer service. The system using the sensor of the invention can be constructed compact and at low cost. The human occupancy detection system of the invention is therefore very simple in configuration, and by using this sensor system, accurate detection of humans can be achieved with ease and at low cost.

Thus, according to the above-described embodiments, human occupancy detection can be performed easily, accurately, and reliably, serving to contribute greatly to the creation of comfortable environment in commuter trains, buses, intelligent buildings, etc.

Rather than estimating the human occupancy ratio from the area ratio, as described above, if the maximum number of persons that can be accommodated in a designated space is known in advance the ratio of human occupancy in that space can be estimated by calculating the number of persons present there from the number of local temperature peaks and by dividing that number by the maximum number of persons that can be accommodated.

The area ratio used in this invention may be calculated based on real area sizes or on pixel areas in a thermo image. For example, there are two methods of obtaining a ratio based on real area sizes. In the first method, the floor area of the designated space is given in advance to the sensor processor or sensor system. Then, the ratio of the area of the human presence region detected by the sensor to the floor area is calculated. In the second method, the area size of the real floor is obtained from the thermo image captured by the sensor. This method requires data on the sensor installation position in the designated space. Further, if there exists a transient, movable object such as a desk, such an object can be detected as a human presence impossible region as it is captured. While the above two methods are based on real area sizes, the third method is not, that is, the ratio is calculated from pixel areas in a thermo image, as first described. For example, the ratio of humans to the floor area is calculated.

As is apparent from the above description, the present invention offers the advantage that the ratio of human occupancy in a designated area can be detected easily and reliably as compared to the prior known system.

What is claimed is:

1. A human occupancy detection method, wherein within a designated space a region containing at least a human is detected using an infrared sensor, a proportion that a detected object occupies in said space is calculated, and based on a result of the calculation, a ratio of human occupancy in said space is estimated.

2. A human occupancy detection method for detecting a ratio of human occupancy in a designated space, wherein said space is detected by an infrared sensor, only a human presence region is extracted from said detected space, and an area ratio of said extracted human presence region relative to a whole detection region is taken as the ratio of human occupancy.

3. A human occupancy detection method for detecting a ratio of human occupancy in a designated space, according to claim 2, wherein, when extracting only a human presence region from the space detected by the infrared sensor, the human presence region is identified by using a clustering technique based on fuzzy inference.

4. A human occupancy detection method for detecting a ratio of human occupancy in a designated space, according to claim 2, wherein, when extracting only a human presence region from the space detected by the infrared sensor, the human presence region is identified by using a modeling technique based on fuzzy inference.

5. A human occupancy detection method for detecting a ratio of human occupancy in a designated space, according to claim 2, wherein, when extracting only a human presence region from the space detected by the infrared sensor, the human presence region is identified by dividing said detection region in a matrix form.

6. A human occupancy detection method for detecting a ratio of human occupancy in a designated space, according to claim 2, wherein an infrared array sensor is constructed by arranging a plurality of detector elements in an array, infrared radiation incident on said sensor is periodically interrupted by chopping means, after making measurements on the outputs of said detector elements for an aiming direction of said infrared array sensor, said aiming direction is turned through a prescribed angle by driving means, said measurements are sequentially repeated, and after finishing said measurements for a final aiming direction, said driving means is rotated backward to an initial aiming direction, thereby extracting the human presence region from the whole detection region.

7. A human occupancy detection method for detecting a ratio of human occupancy in a designated space, wherein said space is detected by an infrared sensor, a human presence impossible region and a human presence region are extracted from said detected space, said human presence impossible region is subtracted from a whole detection region, and an area ratio of said extracted human presence region relative to a result of the subtraction is taken as the ratio of human occupancy.

8. A human occupancy detection method for detecting a ratio of human occupancy in a designated space, according to claim 7, wherein, when extracting only a human presence region from the space detected by the infrared sensor, the human presence region is identified by using a clustering technique based on fuzzy inference.

9. A human occupancy detection method for detecting a ratio of human occupancy in a designated space, according to claim 7, wherein, when extracting only a human presence region from the space detected by the infrared sensor, the human presence region is identified by using a modeling technique based on fuzzy inference.

10. A human occupancy detection method for detecting a ratio of human occupancy in a designated space, according to claim 7, wherein, when extracting only a human presence region from the space detected by the infrared sensor, the human presence region is identified by dividing said detection region in a matrix form.

11. A human occupancy detection method for detecting a ratio of human occupancy in a designated space, according to claim 7, wherein an infrared array sensor is constructed by arranging a plurality of detector elements in an array, infrared radiation incident on said sensor is periodically interrupted by chopping means, after making measurements on the outputs of said detector elements for an aiming direction of said infrared array sensor, said aiming direction is turned through a prescribed angle by driving means, said measurements are sequentially repeated, and after finishing said measurements for a final aiming direction, said driving means is rotated backward to an initial aiming direction, thereby extracting the human presence region from the whole detection region.

12. A human occupancy detection method for detecting a ratio of human occupancy in a designated space, wherein said space is detected by an infrared sensor, a human presence region is extracted from said detected space, a number of signal strength local peaks within said human presence region is obtained, and by taking into account the number of the local peaks thus obtained, the ratio of said human occupancy is estimated on a basis of an area ratio of said extracted human presence region to a whole detection region.

13. A human occupancy detection method for detecting a ratio of human occupancy in a designated space, according to claim 12, wherein, when extracting only a human presence region from the space detected by the infrared sensor, the human presence region is identified by using a clustering technique based on fuzzy inference.

14. A human occupancy detection method for detecting a ratio of human occupancy in a designated space, according to claim 13, wherein, when extracting only a human presence region from the space detected by the infrared sensor, the human presence region is identified by using a modeling technique based on fuzzy inference.

15. A human occupancy detection method for detecting a ratio of human occupancy in a designated space, according to claim 12, wherein, when extracting only a human presence region from the space detected by the infrared sensor, the human presence region is identified by dividing said detection region in a matrix form.

16. A human occupancy detection method for detecting a ratio of human occupancy in a designated space, according to claim 12, wherein an infrared array sensor is constructed by arranging a plurality of detector elements in an array, infrared radiation incident on said sensor is periodically interrupted by chopping means, after making measurements on the outputs of said detector elements for an aiming direction of said infrared array sensor, said aiming direction is turned through a prescribed angle by driving means, said measurements are sequentially repeated, and after finishing said measurements for a final aiming direction, said driving means is rotated backward to an initial aiming direction, thereby extracting the human presence region from the whole detection region.

17. A human occupancy detection system for detecting a ratio of human occupancy in a designated space in a railroad car, wherein said space is detected by an infrared sensor, a human presence region is extracted from a whole detection region, the ratio of human occupancy in the detected space in the railroad car is detected from an area ratio of said extracted human presence region relative to said whole detection region, and said detected human occupancy ratio is notified to passengers in advance.

18. A human occupancy detection system for detecting a ratio of human occupancy in a designated space, according to claim 17, wherein, when extracting only a human presence region from the space detected by the infrared sensor, the human presence region is identified by using a clustering technique based on fuzzy inference.

19. A human occupancy detection system for detecting a ratio of human occupancy in a designated space, according to claim 17, wherein, when extracting only a human presence region from the space detected by the infrared sensor, the human presence region is identified by using a modeling technique based on fuzzy inference.

20. A human occupancy detection system for detecting a ratio of human occupancy in a designated space, according to claim 17, wherein, when extracting only a human presence region from the space detected by the infrared sensor, the human presence region is identified by dividing said detection region in a matrix form.

21. A human occupancy detection system for detecting a ratio of human occupancy in a designated space, according to claim 17, wherein an infrared array sensor is constructed by arranging a plurality of detector elements in an array, infrared radiation incident on said sensor is periodically interrupted by chopping means, after making measurements on the outputs of said detector elements for an aiming direction of said infrared array sensor, said aiming direction is turned through a prescribed angle by driving means, said measurements are sequentially repeated, and after finishing said measurements for a final aiming direction, said driving means is rotated backward to an initial aiming direction, thereby extracting the human presence region from the whole detection region, and thus detecting the ratio of human occupancy in said detected space from a ratio of areas thereof, said detected human occupancy ratio then being fed back to a responsible control system.

22. A human occupancy detection system for detecting a ratio of human occupancy in a designated space in an elevator hall on each floor of a structure, wherein said space is detected by an infrared sensor, a human presence region is extracted from a whole detection region, the ratio of human occupancy in the detected space in said elevator hall is detected from an area ratio of said extracted human presence region relative to said whole detection region, and said detected human occupancy ratio on each floor is fed back to an elevator control system, thereby facilitating smooth operation of elevators.

23. A human occupancy detection system for detecting a ratio of human occupancy in a designated space, according to claim 22, wherein, when extracting only a human presence region from the space detected by the infrared sensor, the human presence region is identified by using a clustering technique based on fuzzy inference.

24. A human occupancy detection system for detecting a ratio of human occupancy in a designated space, according to claim 22, wherein, when extracting only a human presence region from the space detected by the infrared sensor, the human presence region is identified by using a modeling technique based on fuzzy inference.

25. A human occupancy detection system for detecting a ratio of human occupancy in a designated space, according to claims 22, wherein, when extracting only a human presence region from the space detected by the infrared sensor, the human presence region is identified by dividing said detection region in a matrix form.

26. A human occupancy detection system for detecting a ratio of human occupancy in a designated space, according to claim 22, wherein an infrared array sensor is constructed by arranging a plurality of detector elements in an array, infrared radiation incident on said sensor is periodically interrupted by chopping means, after making measurements on the outputs of said detector elements for an aiming direction of said infrared array sensor, said aiming direction is turned through a prescribed angle by driving means, said measurements are sequentially repeated, and after finishing said measurements for a final aiming direction, said driving means is rotated backward to an initial aiming direction, thereby extracting the human presence region from the whole detection region, and thus detecting the ratio of human occupancy in said detected space from a ratio of areas thereof, said detected human occupancy ratio then being fed back to a responsible control system.

27. A human occupancy detection system for detecting a ratio of human occupancy in a designated space in a building, wherein said space is detected by an infrared sensor, a human presence region is extracted from a whole detection region, the ratio of human occupancy in the detected space in said building is detected from an area ratio of said extracted human presence region relative to said whole detection region, and said detected human occupancy ratio is fed back to air-conditioning and illumination control systems for said space.

28. A human occupancy detection system for detecting a ratio of human occupancy in a designated space, according to claim 27, wherein, when extracting only a human presence region from the space detected by the infrared sensor, the human presence region is identified by using a clustering technique based on fuzzy inference.

29. A human occupancy detection system for detecting a ratio of human occupancy in a designated space, according to claim 27, wherein, when extracting only a human presence region from the space detected by the infrared sensor, the human presence region is identified by using a modeling technique based on fuzzy inference.

30. A human occupancy detection system for detecting a ratio of human occupancy in a designated space, according to claim 27, wherein, when extracting only a human presence region from the space detected by the infrared sensor, the human presence region is identified by dividing said detection region in a matrix form.

31. A human occupancy detection system for detecting a ratio of human occupancy in a designated space, according to claim 27, wherein an infrared array sensor is constructed by arranging a plurality of detector elements in an array, infrared radiation incident on said sensor is periodically interrupted by chopping means, after making measurements on the outputs of said detector elements for an aiming direction of said infrared array sensor, said aiming direction is turned through a prescribed angle by driving means, said measurements are sequentially repeated, and after finishing said measurements for a final aiming direction, said driving means is rotated backward to an initial aiming direction, thereby extracting the human presence region from the whole detection region, and thus detecting the ratio of human occupancy in said detected space from a ratio of areas thereof, said detected human occupancy ratio then being fed back to a responsible control system.

32. A human occupancy detection system for detecting a ratio of human occupancy in a designated space at a bus stop, wherein said space is detected by an infrared sensor, a human presence region is extracted from a whole detection region, the ratio of human occupancy in the detected space of said bus stop is detected from an area ratio of said extracted human presence region relative to said whole detection region, and said detected human occupancy ratio is notified to a bus driver, thereby facilitating smooth operation of bus service.

33. A human occupancy detection system for detecting a ratio of human occupancy in a designated space, according to claim 32, wherein, when extracting only a human presence region from the space detected by the infrared sensor, the human presence region is identified by using a clustering technique based on fuzzy inference.

34. A human occupancy detection system for detecting a ratio of human occupancy in a designated space, according to claim 32, wherein, when extracting only a human presence region from the space detected by the infrared sensor, the human presence region is identified by using a modeling technique based on fuzzy inference.

35. A human occupancy detection system for detecting a ratio of human occupancy in a designated space, according to claim 32, wherein, when extracting only a human presence region from the space detected by the infrared sensor, the human presence region is identified by dividing said detection region in a matrix form.

36. A human occupancy detection system for detecting a ratio of human occupancy in a designated space, according to claim 32, wherein an infrared array sensor is constructed by arranging a plurality of detector elements in an array, infrared radiation incident on said sensor is periodically interrupted by chopping means, after making measurements on the outputs of said detector elements for an aiming direction of said infrared array sensor, said aiming direction is turned through a prescribed angle by driving means, said measurements are sequentially repeated, and after finishing said measurements for a final aiming direction, said driving means is rotated backward to an initial aiming direction, thereby extracting the human presence region from the whole detection region, and thus detecting the ratio of human occupancy in said detected space from a ratio of areas thereof, said detected human occupancy ratio then being fed back to a responsible control system.

37. A method for determining the amount of the area in which there is human presence by at least one human within a predetermined area, comprising the steps of:

detecting by a sensor within the predetermined area the total area of presence of humans, and determining the area ratio of occupancy by human presence with respect to the predetermined area.

38. The method according to claim 37, further comprising the step of:

detecting a human presence impossible region in the predetermined area using the sensor, wherein the area ratio of occupancy is determined responsive to the human presence impossible region, the predetermined area, and the total area of presence of humans.

39. A system for determining the amount of the area in which there is human presence by at least one human within a predetermined area, comprising:

a sensor for detecting within the predetermined area the total area of presence of humans, and means for determining the area ratio of occupancy by human presence with respect to the predetermined area.

40. The system according to claim 39, wherein the sensor detects a human presence impossible region in the predetermined area, and the area ratio of occupancy is determined responsive to the human presence impossible region, the predetermined area, and the total area of presence of humans.

* * * * *

UNITED STATES PATENT AND TRADE MARK OFFICE
CERTIFICATE OF CORRECTION

PATENT NO. : 5,703,367
DATED      : December 30, 1997
INVENTOR(S) : Hashimoto et al.

It is certified that error appears in the above-identified patent and that said Letters Patent is hereby corrected as shown below:

Column 19, line 39, delete "13" and insert therefor --12--.

Signed and Sealed this

Nineteenth Day of May, 1998

Attest:

Attesting Officer

BRUCE LEHMAN

Commissioner of Patents and Trademarks